(12) United States Patent
Chung

(10) Patent No.: US 8,465,717 B2
(45) Date of Patent: Jun. 18, 2013

(54) METHOD FOR MAKING NANOPARTICLES OF LITHIUM TRANSITION METAL PHOSPHATES

(76) Inventor: Sung Yoon Chung, Incheon (KR)

(*) Notice: Subject to any disclaimer, the term of this patent is extended or adjusted under 35 U.S.C. 154(b) by 774 days.

(21) Appl. No.: 12/593,291

(22) PCT Filed: Dec. 28, 2007

(86) PCT No.: PCT/KR2007/006977
§ 371 (c)(1),
(2), (4) Date: Sep. 27, 2009

(87) PCT Pub. No.: WO2008/130093
PCT Pub. Date: Oct. 30, 2008

(65) Prior Publication Data
US 2010/0074822 A1    Mar. 25, 2010

(30) Foreign Application Priority Data

Apr. 20, 2007  (KR) .................. 10-2007-0038984

(51) Int. Cl.
*C01B 25/30*    (2006.01)
(52) U.S. Cl.
USPC ........................................ 423/306; 429/231.1
(58) Field of Classification Search
USPC ............... 423/306, 305; 429/218.1, 221, 223, 429/224
See application file for complete search history.

(56) References Cited

U.S. PATENT DOCUMENTS 5,322,559 A    6/1994  Sleight
6,794,084 B2   9/2004  Adamson et al.
7,998,618 B2 * 8/2011  Nuspl et al. ............... 429/218.1
2004/0005265 A1  1/2004  Chiang et al.
2011/0212365 A1 * 9/2011  Audemer et al. ............ 429/221

FOREIGN PATENT DOCUMENTS

| CN | 1785800 A | 6/2006 |
|---|---|---|
| CN | 101049922 A | 10/2007 |
| KR | 10-2001-0080496 | 8/2001 |
| KR | 10-2004-0011498 | 2/2004 |

(Continued)

OTHER PUBLICATIONS

L.M. Hirsch et al., "Quantitative olivine-defect chemical model: insights on electrical conduction, diffusion, and the role of Fe content", Geophys. J. Int,. vol. 114, p. 21-35 (1993).

(Continued)

*Primary Examiner* — Wayne Langel
*Assistant Examiner* — Syed Iqbal
(74) *Attorney, Agent, or Firm* — Renaissance IP Law Group LLP

(57) ABSTRACT

A process for preparing a nanoparticle powder of a lithium transition metal phosphate includes mixing lithium, a transition metal and a phosphorus-containing salt as starting materials, adding an additive to the starting materials in an amount of greater than 0 at % and less than 10 at % to obtain a mixed raw material powder, subjecting the mixed powder to a first heat treatment at a temperature of 250° C. to 400° C. under a gas atmosphere for 2 to 10 hours; and subjecting the first heat-treated product to a second heat treatment at a temperature of 400° C. to 700° C. for 2 to 24 hours to uniformly form crystalline nuclei so as to induce growth of nanocrystalline particles. The additive may be any one element selected from the group consisting of sodium (Na), potassium (K), lanthanum (La), cerium (Ce), praseodymium (Pr), neodymium (Nd), samarium (Sm), gadolinium (Gd) and erbium (Er).

19 Claims, 19 Drawing Sheets

50 μm

FOREIGN PATENT DOCUMENTS

| KR | 10-2006-0054709 | 5/2006 |
| --- | --- | --- |
| KR | 10-2006-0101508 | 9/2006 |
| KR | 100821832 B1 | 4/2008 |
| WO | 2008/145034 A1 | 12/2008 |

OTHER PUBLICATIONS

C.M.B. Henderson et al., "High Temperature Study of Octahedral Cation exchange in Olivine by Neutron Powder Diffraction", Science, vol. 271, p. 1713-1715 (1996).

A.K. Padhi et al., "Phospho-olivines as Positives—Electrode Materials for Rechargeable Lithium Batteries", J. Electrochem. Soc., vol. 144, No. 4, p. 1188-1194 (1997).

H. Huang et al., "Approaching Theoretical Capacity of LeFiPO4 at Room Temperature at High Rates", Electrochem. Solid-State Lett., vol. 4, p. A170-A172 (2001).

J.-M. Tarascon el al., "Issues and challenges facing rechargeable lithium batteries", Nature, vol. 414, p. 359-367 (2001).

F. Croce et al., "A Novel Concept for the Synthesis of an Improved LiFePO4 Lithium Battery Cathode", Electrochem. Solid-State Lett., vol. 5, p. A47-A50 (2002).

Sung-Yoon et al., "Microscale Measurements of the Electrical Conductivity of Doped LiFePO4", Electrochem. and Solid-State Lett. 6, p. A278-A281 (2003).

D. Morgan et al., "Li Conductivity in LixMPO4 (M=Mn, Fe, Co, Ni) Olivine Materials", Electrochem. Solid-State Lett., vol. 7, p. A30-A32 (2004).

M.S. Islam et al., "Atomic-Scale Investigation of Defects, Dopants, and Lithium Transport in the LiFePO4 Olivine-Type Battery Materials", Chem. Mater, vol. 17, p. 5085-5092 (2005).

M. Varela et al., "Materials Characterization in the Aberration-Corrected Scanning Transmission Electron Microscope", Korea Advanced Institute of Science and Technology, p. 539-569 and c-1-c-12 (2006).

Y.-H. Huang et al., "Improving Lithium Batteries by Tethering Carbon-Coated LiFePO4 to Polypyrole", J. Electrochem. Soc., vol. 153, p. A2282-A2286 (2006).

Shin-Ichi Nishimura et al., "Experimental Visualization of Lithium diffusion of LixFePO4", Nature Materials, vol. 7, p. 707-711 (2008).

D.B. Williams et al., "Transmission Electron Microscopy, A Textbook for Materials Science (Part 3. Imaging)", Plenum Press, p. 351-360, (1996).

G.-A. Nazzri et al., "Lithium Batteries", Kluwer Academic Publisher, p. 3-11, (2004).

Sung-Yoon Chung et al., "Orientation-Dependent Arrangement of Antisite Defects in Lithium Iron(II) Phosphate Crystals", Angew. Chem. Int. Ed., p. 543-546 (2009).

Non-Final OA of U.S. Appl. No. 12/633,836 mailed Jun. 18, 2012.

\* cited by examiner c : 4% K added LiFe$_{0.98}$PO$_4$, 350C, 2 h
b : 4% Na added LiFe$_{0.98}$PO$_4$, 350C, 2 h
a : undoped LiFePO$_4$, 350C, 2 h 4% Na added LiFe$_{0.98}$PO$_4$, 350C, 2 h 4% K added LiFePO$_4$, 350C, 5 h a : 4 mol% Na added LiFe$_{0.98}$PO$_4$, 450C, 3 h b : 4 mol% K added LiFe$_{0.98}$PO$_4$, 450C, 3 h 4 mol% Na added LiFe$_{0.98}$PO$_4$, 450C, 3 h 4 mol% K added LiFePO$_4$, 450C, 3 h 2% Er added –LiFePO4 (500C, 10h)

2% Ce added –LiFePO4 (500C, 10h)

2% Er added –LiFePO4 (500C, 10h)

4% K added LiFePO$_4$

4% K added Li$_{0.85}$FePO$_4$

4% K added Li$_{0.70}$FePO$_4$

4% K added Li$_{0.50}$FePO$_4$ 350C, 5 h

4% K added LiFePO$_4$

4% K added Li$_{0.85}$FePO$_4$

4% K added Li$_{0.70}$FePO$_4$

4% K added Li$_{0.50}$FePO$_4$ 450C, 3 h (Li0.95Na0.05)MnPO4, 450C, 2h (Li0.95Na0.05)FePO4, 450C, 2h (Li0.95Na0.05)CoPO4, 450C, 1h Li(Co$_{0.98}$Na$_{0.04}$)PO$_4$, 700C, 20 h

Ordered Olivine Structure

METHOD FOR MAKING NANOPARTICLES OF LITHIUM TRANSITION METAL PHOSPHATES

CROSS-REFERENCE TO RELATED APPLICATION

This application is a U.S. national phase application of PCT International Application PCT/KR2007/006977, filed Dec. 28, 2007, which claims priority to Korean Patent Application No. 10-2007-0038984, filed Apr. 20, 2007, the contents of which are incorporated herein by reference in their entirety.

TECHNICAL FIELD

The present invention relates to synthesis and process conditions for lithium transition metal phosphate having an olivine structure, which is receiving a great deal of attention as a next-generation cathode material for a lithium ion secondary battery, e.g. $LiMPO_4$ (M=Fe, Mn, Co, Ni, Ti, Cu or any combination thereof), and applications thereof. More specifically, the present invention relates to a process for preparing a nanoparticle powder of lithium transition metal phosphate, involving synthesis of lithium transition metal phosphate ($LiMPO_4$) (M=Fe, Mn, Co, Ni, Ti, Cu or any combination thereof) into a nanoparticle powder having a particle size of less than 100 nm to thereby significantly reduce a diffusion distance of lithium ions within particles, which consequently results in full exploitation of a capacity of an electrode material corresponding up to a theoretical capacity thereof and formation of nanoparticles having a high electrical conductivity within a short period of time, and which is also capable of achieving efficient industrial-scale production of a desired compound via a heat treatment at a low temperature of less than 600° C. for a short period of time of less than 4 hours while overcoming a shortcoming of a low electrical conductivity, using solid raw materials.

BACKGROUND ART

Caving consideration to the current trend for increasing development of portable wireless electronic products, there is a strong need for development of a secondary battery having a high energy density in order to achieve miniaturization and weight reduction of these electronic devices and instruments.

As the secondary battery, there have been used lead acid batteries, nickel cadmium (Ni—Cd) batteries, nickel metal hydride batteries, and the like. In recent years, lithium ion batteries are widely used due to the light weight and high energy density, since it was first commercialized in 1991.

As a cathode material for the lithium ion battery, lithium cobalt oxide ($LiCoO_2$) basically having a layered rock-salt structure is currently the most widely used material, and has been recognized as the most important ingredient constituting the lithium ion battery (G.-A. Nazri and G. Pistoia, "*Lithium Batteries*", Kluwer Academic Publishers, 2004).

However, the lithium cobalt oxide ($LiCoO_2$) suffers from disadvantages such as relative expensiveness of a cobalt (Co) material per se, as compared to other transition metals such as iron (Fe), manganese (Mn), nickel (Ni), and so on, and environmental harmfulness. For these reasons, there is a continuing attempt to develop a solid solution oxide which is synthesized with replacement of Co with Mn or Ni.

Further, a layered oxide material such as the aforementioned $LiCoO_2$ has a shortcoming associated with deterioration of the structural stability, due to the release of oxygen which occurs upon intercalation and deintercalation of lithium ions.

Further, the $LiCoO_2$ suffers from a very high risk of explosion, when a particle size of the lithium cobalt oxide decreases to a nanoscale level, so there has been continuously raised fundamental problems associated with safety concerns. Therefore, there is a limit in production and utilization of nanoscale particles having a large specific surface area in order to obtain excellent output characteristics.

As discussed above, with various problems associated with the use of the $LiCoO_2$ as a cathode material, and in order to secure the battery safety via prevention of probable explosion due to overcharge or overheating while achieving a higher energy density, a great deal of research and study has been focused on development of a novel synthesis method or a novel cathode material which is totally different from a conventional oxide material. Among other things, lithium transition metal phosphates with an olivine structure ($LiMPO_4$) (M=Fe, Mn, Co, Ni, Ti, Cu or any combination thereof) are attracting a great deal of interest as a next-generation cathode material in the future (J.-M. Tarascon and M. Armand, *Nature*, Vol. 414, p. 359 (2001)).

Since the first experimental demonstration, made by Goodenough et al at The University of Texas (A. K. Padhi, K. S, Nanjundaswamy, and J. B. Goodenough, *J. Electrochem. Soc.*, Vol. 144, p. 1188 (199'7)), reporting that the electrochemical intercalation and deintercalation of lithium ions can take place in $LiFePO_4$ which is a kind of the aforesaid $LiMPO_4$, numerous research groups and institutions have proposed various synthesis methods of $LiMPO_4$ in conjunction with intensive research for practical application of $LiMPO_4$ as a cathode material.

Generally, the $LiMPO_4$ can be represented by a general formula of $M'M''(XO_4)$ (M' and M''=a metal cation including a transition metal, and X=P, S, As, Mo, Si or B), and the crystal structure thereof is identical with that of the mineral olivine $[(Mg,Fe)_2 (SiO_4)]$. In the $LiMPO_4$, lithium (Li) is positioned in an oxygen octahedral interstitial of the M' site, and the transition metal (M) is positioned in an oxygen octahedral interstitial of the M' site, thereby forming an ordered olivine structure. Among the $LiMPO_4$, $LiFePO_4$ and $Li(Fe, Mn)PO_4$ compounds are natural minerals already well known as Triphylite.

A cathode material for a lithium ion battery should be thermally and chemically stable. Referring to the crystal structure of the $LiMPO_4$, phosphorus (P) and oxygen (O) participate in the formation of a strong covalent bond to thereby result in a tetrahedral structure, so the $LiMPO_4$ advantageously exhibit excellent thermal and chemical stability, unlike conventional layered oxide materials suffering from a poor structural stability due to release of oxygen which occurs upon intercalation/deintercalation of lithium ions. The lithium transition metal phosphate ($LiMPO_4$) has a structure in which octahedra of the transition metal (M) and oxygen (O) are connected in a one-dimensional chain structure. Further, due to the ordered one-dimensional arrangement of lithium ions within another oxygen octahedron in the Y-axis direction, upon viewing the structure of $LiMPO_4$ on the rectangular coordinate system, it is predicted that the mobility of lithium ions in the Y-axis direction will be very high (D. Morgan, A. Van der Ven, and G. Ceder, *Electrochem., Solid-State Lett.*, Vol. 7, p.A30 (2004)).

Further, as another important technical factor required for utilization of the $LiMPO_4$ as the cathode material for the lithium ion battery, the electrical conductivity should be taken into account. Generally, an electrode material employed in the lithium ion battery is essentially required to have an excellent electrical conductivity in order to achieve minimization of polarization effects arising from the redox reaction and an effective supply of electrons to the connected external resistance.

The LiFePO$_4$ has an electrical conductivity of less than 10$^{-9}$ S/cm and is therefore substantially an insulating material at room temperature. Upon considering the fact that an electrode material employed in the lithium ion battery is required to have an excellent electrical conductivity in order to achieve minimization of polarization effects arising from the redox reaction and an effective supply of electrons to the connected external resistance, it was revealed that the LiFePO$_4$ suffers from a fatal disadvantage in that it is not suitable for practical application as the cathode material in the lithium ion battery, despite excellent crystallographic, thermal and chemical properties.

A variety of experimental approaches have been attempted to overcome the above-mentioned disadvantages and problems. For example, mention may be made of a method of coating the surface of the already-synthesized LiFePO$_4$ particles with a variety of carbon materials including graphite having an excellent electrical conductivity to thereby decrease the resistance between particles, thus providing a path through which electrons can be conducted sufficiently (H. Huang, S. C. Yin, and L. F. Nazar, *Electrochem. Solid-State Lett.*, Vol. 4, p.A170 (2001); and Y.-H. Huang, K.-S. Park, and J. B. Goodenough, *J. Electrochem. Soc.*, Vol. 153, p.A2282 (2006)), or a method of improving an electrical conductivity of an electrode material by combined addition of small silver or copper metal particles upon synthesis of LiFePO$_4$ particles (F. Croce et al., *Electrochem. Solid-State Lett.*, Vol. 5, p. A47 (2002)).

However, most of the aforementioned conventional approaches and attempts suffer from disadvantages such as additional coating processes, and addition of non-active materials which have no relation to the electrode material during a production process. Accordingly, there is a need to find alternative methods of research on LiMPO$_4$.

DISCLOSURE OF INVENTION

Technical Problem

Therefore, the present invention has been made in view of the above problems, and it is an object of the present invention to provide a process for preparing a nanoparticle powder of lithium transition metal phosphate, which involves synthesis of LiMPO$_4$ (M=Fe, Mn, Co, Ni, Ti, Cu or any combination thereof) into a nanoparticle powder having a particle size of less than 100 nm to thereby significantly reduce a diffusion distance of lithium ions within particles, which consequently results in full exploitation of a capacity of an electrode material corresponding up to a theoretical capacity thereof.

It is another object of the present invention to provide a process for preparing a nanoparticle powder of lithium transition metal phosphate, which is capable of forming nanoparticles having a high electrical conductivity within a short period of time, by addition of alkali elements having a relatively large ion radius, such as potassium (K), sodium (Na), and lanthanide elements such as lanthanum (La), cerium (Ce), praseodymium (Pr), neodymium (Nd), samarium (Sm), gadolinium (Gd) and erbium (Er), to a basic composition of conventional solid-state synthesis involving a first heat treatment of materials at a temperature of less than 400° C. to decompose carbon (C), hydrogen (H), oxygen (O) and ammonium (NH$_4$) contained in starting materials such as carbonates, oxalates, and ammonium phosphates, and a second heat treatment of the first heat-treated materials at a temperature of more than 400° C. to achieve crystallization thereof.

It is a further object of the present invention to provide a process for preparing a nanoparticle powder of lithium transition metal phosphate, which is capable of achieving efficient industrial-scale production of a nanoparticle powder of fine lithium transition metal phosphate (LiMPO$_4$) having a particle size of several tens of nanometers via a heat treatment at a low temperature of less than 600° C. for a short period of time of less than 4 hours while overcoming a shortcoming of a low electrical conductivity, using solid-state raw materials.

It is yet another object of the present invention to provide a process for preparing a nanoparticle powder of lithium transition metal phosphate which has a high energy density and high-rate charge/discharge performance capable of achieving rapid charge within a short period of time of several minutes, and is therefore capable of exhibiting discharge performance of a high power density.

Various processes have been proposed for preparing single-component metal nanoparticles consisting of a single composition or nanoparticles of a binary intermetallic compound or an oxide thereof, so it is possible to easily prepare such nanoparticles. However, it is very difficult and complicated to synthesize nanoparticles for a material which consists of four different elements and is also required to have an ordered arrangement of each element in the crystal structure, as shown in the LiMPO$_4$. Therefore, a very important technical problem to be solved is to propose a method for preparing LiMPO$_4$ which involves a simplified manufacturing process and is capable of easily achieving large-scale synthesis. The present invention has been made to solve the aforementioned problem.

Technical Solution

In accordance with an aspect of the present invention, the above and other objects can be accomplished by the provision of a process for preparing a nanoparticle powder of lithium transition metal phosphate, using lithium-, transition metal- and phosphorus-containing salts as starting materials, with addition of any one element or any combination selected from the group consisting of sodium (Na), potassium (K), lanthanum (La), cerium (Ce), praseodymium (Pr), neodymium (Nd), samarium (Sm), gadolinium (Gd) and erbium (Er) in an amount of less than 10 at % to thereby inhibit unintentional crystal growth in a first heat treatment, subjecting the reactants to the first heat treatment at a temperature of 250° C. to 400° C. for 2 to 10 hours, and subjecting the thus-treated reactants to a second heat treatment at a temperature of 400° C. to 700° C. for 2 to 24 hours to uniformly form crystalline nuclei so as to induce homogeneous growth of nanocrystalline particles.

In one embodiment of the present invention, the starting materials are preferably selected from the group consisting of carbonates, oxalates, acetates, and ammonium phosphates.

Preferably, the carbonate includes lithium carbonate (Li$_2$CO$_3$), the oxalate includes M C$_2$O$_4$(2H$_2$O) (M=Fe, Mn, Co, Ni, Ti, Cu or any combination thereof), and the ammonium phosphate includes ammonium dihydrogen phosphate (NH$_4$H$_2$PO$_4$).

Preferably, an additive for Na includes sodium carbonate (Na$_2$CO$_3$), an additive for K includes potassium carbonate (K$_2$CO$_3$), and an additive for the lanthanide element includes A$_2$(C$_2$O$_4$)$_3$(nH$_2$O) (A=La, Ce, Pr, Nd, Sm, Gd, or Er, and 1=n=9) as a salt material.

Preferably, the additive for the lanthanide element is at least one selected from the group consisting of $Ce_2(C_2O_4)_3$ $(9H_2O)$, $Nd_2(C_2O_4)_3(5H_2O)$, $Gd_2(C_2O_4)_3(5H_2O)$, $Er_2(C_2O_4)_3(5H_2O)$ and any combination thereof.

Preferably, the additive element is added to make an initial stoichiometric composition of $(Li_{1-x}A_x)(M_{1-y}B_y)PO_4$ or $(LiA_x)(MB_y)PO_4$ (A or B=Na, K, La, Ce, Pr, Nd, Sm, Gd, or Er, $0<x\leq0.1$, and $0<y\leq0.1$).

Preferably, the mixed powder is obtained by suction-mixing the starting materials and additives in acetone as a solvent and drying the mixture.

Preferably, the first heat treatment and the second heat treatment are carried out under a gas atmosphere of any one selected from argon (Ar), nitrogen ($N_2$), and carbon monoxide/carbon dioxide ($CO/CO_2$) at a flow rate of 100 to 500 cc/min.

Preferably, the first heat treatment is carried out at 350° C. for 5 hours or less.

Preferably, the nanocrystalline particles have a particle size of less than 100 nm.

Preferably, the nanocrystalline particles have a olivine structure.

Preferably, the nanocrystalline particles have a resistance value of 20 kΩ to 800 kΩ.

Advantageous Effects

As will be illustrated hereinafter, the present invention enables easy and convenient production of nanoparticles of lithium transition metal phosphate having a uniform particle size of less than 100 nm at a low temperature of less than 500° C. within a short period of time of less than 10 hours, via a simple solid-phase synthesis. In particular, the method of the present invention is a synthesis method which does not involve liquid-state raw materials or complicated and difficult coating processes and employs inexpensive solid-state salts, so it is advantageously possible to achieve industrial-scale production of a desired product. In addition, the nanoparticles of lithium transition metal phosphates thus synthesized have an excellent electrical conductivity with no random anti-site intermixing defects between lithium ions and transition metal ions within crystal lattices, and therefore can advantageously exhibit excellent electro chemical performance. Therefore, upon practical application of the nanoparticles of the present invention as a cathode active material for a lithium-ion secondary battery, it is possible to achieve a high energy density due to an excellent discharge capacity. More importantly, it is possible to fabricate a battery having a very high power density, based on charge/discharge performance during a short period of time.

BEST MODE FOR CARRYING OUT THE INVENTION

Hereinafter, the process of the present invention according to the aforesaid constitution will be described in more detail.

Figure 1:
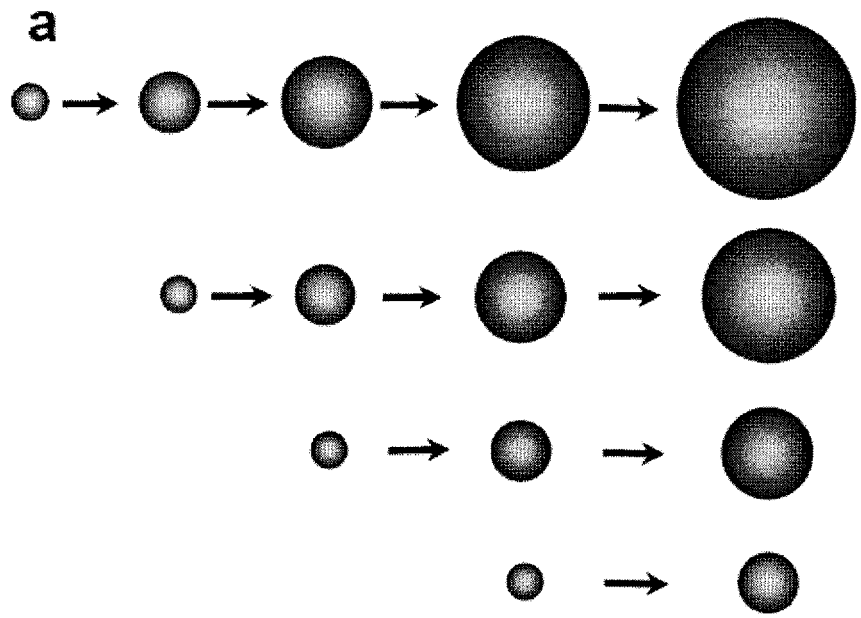
FIG. 1 is a schematic comparison of concepts necessary for preparation of nano particles having a uniform particle size in the present invention.
Figure 1:
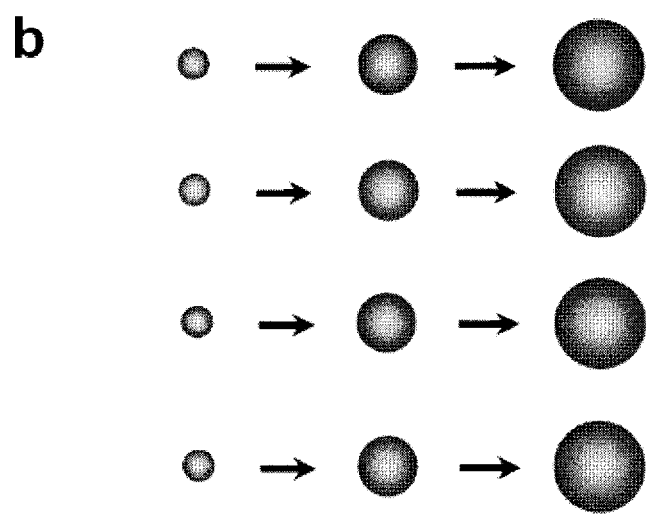

FIG. 1 schematically shows a concept which controls nucleation and subsequent growth of nanocrystals during crystallization to obtain a fine particle size and is also capable of narrowing distribution of the final particle size. An effort should be made to minimize inhomogeneous formation of crystalline nuclei which may occur during the heat treatment throughout the entire synthesis process, as shown in FIG. 1a. For this purpose, the initial heat treatment should be controlled to achieve uniform formation of nuclei, such that it is possible to obtain final particles with fine size and uniform distribution, as shown in FIG. 1b.

In order to ensure uniform formation of nuclei upon the initial heat treatment as above, alkali metal ions or lanthanide metal ions are added. First, various salts such as carbonates, oxalates, acetates, ammonium phosphates, which contain lithium, transition metals and phosphorus, are used as starting materials, and any one element or any combination selected from the group consisting of Na, K, La, Ce, Pr, Nd, Sm, Gd and Er is added in an amount of less than 10 mol % to thereby make an initial stoichiometric composition of $(Li_{1-x}A_x)(M_{1-y}B_y)PO_4$ or $(LiA_x)(MB_y)PO_4$ (A or B=Na, K, La, Ce, Pr, Nd, Sm, Gd, or Er, $0<x\leq0.1$, and $0<y\leq0.1$).

Next, these raw material powders in conjunction with the additive powders are subjected to mixing in acetone as a solvent, followed by drying. The resulting mixture of the raw material powders is then subjected to first calcination at a temperature between 250° C. and 400° C. for 2 to 10 hours. The calcination heat treatment is carried out under a gas atmosphere of Ar, N$_2$, or CO/CO$_2$ at a flow rate of 100 to 500 cc/min. Such a first heat treatment leads to decomposition of C, H, O, and NH$_3$ contained in the raw material powders, thereby resulting in formation of an amorphous LiMPO$_4$. If the heat treatment is carried out at a temperature of more than 400° C. for 10 hours or more, this results in gradual formation of crystalline nuclei from the amorphous material, finally leading to the formation of non-uniformly coarsened particles. Therefore, in order to suppress the inhomogeneous nucleation, the first heat treatment may be preferably carried out at 350° C. for 5 hours or less.

Next, the thus-obtained amorphous powder is cooled to room temperature and then subjected to a second heat treatment at a temperature of 400° C. to 700° C. for 2 to 24 hours under the same gas atmosphere. The second heat treatment results in formation of crystalline nuclei from an amorphous phase, finally leading to growth of nanoscale particles from the thus formed crystalline nuclei. Therefore, it is possible to prepare nanoparticles of the LiMPO$_4$ having a desired particle size by appropriately controlling the temperature and time of the second heat treatment.

Generally, a melting point of the salts containing an alkali metal ion, such as Na$_2$CO$_3$ and K$_2$CO$_3$, is usually very low. Therefore, these additives bring about an effective reaction of lithium-, transition metal- and phosphorus-containing salts even at a relatively low temperature of 250° C. to 400° C. upon the first heat treatment, thereby serving to synthesize an amorphous starting material with efficient inhibition of in homogeneous crystalline nucleation. Further, since the second heat treatment, which will be carried out at a higher temperature than the first heat treatment, leads to growth of nanoparticles from the uniformly formed crystalline nuclei, it is possible to prepare nanocrystalline particles of the LiMPO$_4$ having a particle size of several tens of nanometers from the amorphous phase, by appropriately controlling the heat treatment temperature and time.

Further, it was discovered through various experiments that alkali metals such as Na and K, as well as lanthanide elements such as La, Ce, Pr, Nd, Sm, Gd and Er exhibit the same effects as described above.

In the present invention, one of the most important points is to control the heat treatment condition to thereby maintain the amorphous phase of the starting materials, such that formation of undesired large and coarse particles does not occur upon the first heat treatment. Additives of the aforementioned alkali metal ions and lanthanide metal ions enable the reaction between the starting materials at a lower temperature upon the first heat treatment, easily resulting in an amorphous state of the mixture of the starting materials, and also serve to effectively inhibit a phase transition into a crystalline phase from an amorphous phase. Further, upon the second heat treatment which is carried out at a relatively higher temperature, such additives serve to help uniform formation of crystalline nuclei from the amorphous phase, finally leading to the growth of ultrafine crystalline particles which have a similar particle size at the nanometer level. Therefore, the present invention enables final production of fine and uniform nanoparticles of LiMPO$_4$ by adding the alkali elements and the lanthanide elements in an amount of less than 10 mol % to thereby induce a uniform nucleation rate of crystalline particles.

Even though LiMPO$_4$ is known to be an electrical insulator having an electrical conductivity of $10^{-9}$ to $10^{-12}$ S/cm, as conventionally measured by other research groups, the particles prepared by the method of the present invention exhibit an improved electrical conductivity of at least $10^{-3}$ S/cm. Additives of the alkali elements and the lanthanide elements have an ionic radius much larger than that of lithium ions or transition metal ions (such as Fe$^{2+}$, Mn$^{2+}$, Co$^{2+}$, Ni$^{2+}$, Ti$^{2+}$, and Cu$^{2+}$), so they are not soluble into crystal lattices of LiMPO$_4$ and finally most of them form a secondary phase. For reference, the ionic radius (unit: nm) of each element is as follows: 0.076 for Li$^+$, 0.078 for Fe$^{2+}$, 0.083 for Mn$^{2+}$, 0.075 for Co$^{2+}$, 0.069 for Ni$^{2+}$, 0.086 for Ti$^{2+}$, 0.073 for Cu$^{2+}$, 0.138 for K$^+$, 0.102 for Na$^+$, 0.103 for La$^{3+}$, 0.087 for Ce$^{4+}$, 0.098 for Nd$_{3+}$, 0.096 for Sm$^{3+}$, 0.094 for Gd$^{3+}$, and 0.089 for Er$^{3+}$. When the thus-added ions are subjected to the second heat treatment at a temperature of 400° C. or higher, it was confirmed through high-temperature in situ observation under a high-resolution transmission electron micrograph (HRTEM) that they play an important role in growth and coarsening (Ostwald ripening) of crystals which occur relatively rapidly from the crystalline nuclei. During the fast growth of such nuclei that is thermodynamically metastable, lithium ion vacancies are formed inside the crystal lattice, or otherwise residual carbon atoms in the starting materials may migrate into the crystal lattice to thereby replace phosphorus ions. In this case, lithium ion vacancies and carbon atoms are ionized to have an effectively negative charge. Because the overall charge neutrality condition should be always maintained throughout the inside of the crystal lattice, some of transition metal ions will have an atomic value of 3+ instead of 2+ so as to compensate the resulting negatively charged lithium ion vacancies or replaced carbon atom. Therefore, it is possible to obtain conductivity-enhancing effects by the electron hole transfer between M$^{2+}$ and M$^{3+}$. In particular, if the carbon atoms, which were initially present in the starting materials, become soluble during the heat treatment, the negatively charged impurities that should be compensated increase. As a result, the concentration of the transition metals that have an atomic valence of 3+ instead of 2+ becomes higher. Accordingly, more preferably, when nanoparticles are prepared using carbonates, oxalates, acetates, and ammonium phosphates, which contain carbon atoms, as the starting materials, it is possible to prepare $LiMPO_4$ particles having a superior electrical conductivity.

Further, the present invention enables production of particles with ordered olivine structure where lithium and transition metals are well ordered in the crystal lattices, within a short period of time. As mentioned above, upon theoretical review of the unit lattice of the $LiMPO_4$, lithium is positioned in an oxygen octahedron of the M' site, and the transition metal (M) is positioned in an oxygen octahedron of the M" site, thereby forming an ordered olivine structure. However, as already reported in the mineral olivine of $(Mg,Fe)_2SiO_4$, a material with an olivine structure may have random intermixing defects wherein cations of M' and M' sites are disorderly positioned with respect to each other. In particular, a recent study has reported that the formation energy for such random anti-site intermixing defects in $LiFePO_4$ is lower than the formation energy for other ionic vacancies (M. S. Islam, D. J. Driscoll, C. A. J. Fisher, and P. R. Slater, Chem. Mater., Vol. 17, p. 5085 (2005)). Thus, it can be seen that the intermixing anti-site defects are one of the most probably defects that may easily occur upon high-temperature heat treatment in $LiMPO_4$. If transition metal ions are positioned in the M' site where lithium ions are occupied, the presence of transition metal ions on a migration path of lithium ions upon a charge/discharge reaction interferes with migration of lithium ions in the crystal lattice, which consequently decreases a discharge capacity and also inhibits rapid diffusion of lithium ions, thus deteriorating output power properties of the cells. Accordingly, it is very important to prepare the $Li MPO_4$ having a crystallographically ordered cation arrangement.

From the image of the $LiMPO_4$ prepared according to the present invention using high-angle annular dark field (HAADF) scanning transmission electron microscopy (STEM), it was confirmed that the product of the present invention has a highly ordered cation arrangement. In particular, it was also confirmed that even when particles are prepared to have a lithium ion:transition metal ion ratio of 1-x:1 or 1:1-x ($0<x\leq0.1$) as well as an exact stoichiometry of 1:1 in the initial composition of the product upon synthesis of the $LiMPO_4$, all of $LiMPO_4$ particles are uniformly synthesized into ultrafine nanocrystalline particles. Moreover, it was found that even upon synthesis of nanoparticles starting from the ratio of lithium ion:transition metal ion which is not 1:1, there is no effect of such an ionic ratio on size control, electrical conductivity and electrochemical properties of final particles. Therefore, since nano particles will have a significantly broader range of a non-stoichiometric ratio due to no need for precise control of the cation ratio upon preparation of nanoparticles, it is possible to take a significant advantage associated with the convenience for synthesis of the nanoparticles.

The present invention demonstrates that nanocrystalline $LiMPO_4$ particles having a size of less than 100 nm can be prepared by adding elements of Na, K, La, Ce, Pr, Nd, Sm, Gd and Er in an amount of less than 10 mol % to thereby to make an initial stoichiometric composition of $(Li_{1-x}A_x)(M_{1-y}B_y)PO_4$ or $(LiA_x)(MB_y)PO_4$ (A or B=Na, K, La, Ce, Pr, Nd, Sm, Gd, or Er, $0<x\leq0.1$, $0<y\leq0.1$, and M=Fe, Mn, Co, Ni, Ti, Cu or any combination thereof), followed by synthesis of particles at a lower temperature for a short period of time, as compared to previous methods.

Then, the thus-prepared crystalline $LiMPO_4$ particles exhibit a significantly enhanced electrical conductivity as compared to those prepared by previous synthesis methods, and a well-ordered arrangement of lithium ions and transition metal ions on the M' and M" sites within the crystal lattices.

Due to these various advantages, when such particles of the present invention are used as a cathode material for electrochemical cells such as lithium-ion secondary batteries, it is possible to obtain a charge/discharge capacity value approximate to a theoretical capacity of 160 mAh/g. Further, particles of the present invention can involve fast migration of lithium ions within the crystal lattices, and therefore can also exhibit excellent electrochemical properties capable of being charged/discharged within several minutes, i.e. a high power density.

MODE FOR THE INVENTION

Now, preferred embodiments of the present invention will be described in more detail with reference to the following Examples, Analysis Examples and Test Examples in conjunction with the accompanying drawings, such that those skilled in the art can easily practice the present invention. These and other objects, advantages and features of the present invention will become apparent from the detailed embodiments given below which are made in conjunction with the following Examples.

The present invention may be embodied in different forms and should not be mis-construed as being limited to the embodiments set forth herein, and those skilled in the art will appreciate that various modifications, additions and substitutions are possible without departing from the scope and spirit of the invention as disclosed in the accompanying claims. Therefore, it should be understood that the embodiments disclosed herein are provided only for illustrating the present invention and should not be construed as limiting the scope and spirit of the present invention.

As used herein, the term "C rate" means that measurement conditions are controlled upon performing a battery test, such that charge or discharge can be carried out for 1 hour. More generally, the term "C/n rate" means that measurement conditions are established such that charge or discharge can be carried out for n hours.

Example 1

This example is intended to illustrate a process for preparing nanocrystalline particles of $LiFePO_4$ having a starting composition of $(Li_{1-x}A_y)FePO_4$ or $Li(Fe_{1-x}A_y)PO_4$ (A=Na or K, $0<x\leq0.1$, and $0<y\leq0.1$) with addition of an alkali element such as K or Na.

Starting material powders used for preparation of the nanocrystalline particles of $LiFePO_4$ were lithium carbonate ($Li_2CO_3$), iron (II) oxalate ($FeC_2O_4(2H_2O)$), and ammonium dihydrogen phosphate ($NH_4H_2PO_4$). The powders used as additives were sodium carbonate ($Na_2CO_3$) and potassium carbonate ($K_2CO_3$). Three starting material powders and additive powders were 99.5% pure or higher.

First, in order to synthesize pure $LiFePO_4$ powder without addition of the additives, a powder of $Li_2CO_3$, $FeC_2O_4$ ($2H_2O$) and $NH_4H_2PO_4$ in a molar ratio of 0.5:1:1 was prepared. Then, these materials in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Further, in order to synthesize LiFePO$_4$ nanoparticles with addition of 4-mol % K or Na, a powder mixture was prepared in the same manner as above. In particular, the mixed powders having different stoichiometric ratios of Li and Fe were prepared and compared to each other.

First, in order to synthesize LiFePO$_4$ nanoparticles with addition of 4-mol % K, a mixed powder of Li$_2$CO$_3$, FeC$_2$O$_4$ (2H$_2$O) and NH$_4$H$_2$PO$_4$ in a molar ratio of 0.5:1:1 was prepared. Second, in order to synthesize LiFe$_{0.98}$PO$_4$ nanoparticles with addition of 4-mol % K, a mixed powder of Li$_2$CO$_3$, FeC$_2$O$_4$(2H$_2$O) and NH$_4$H$_2$PO$_4$ in a molar ratio of 0.5:0.98:1 was prepared. Third, in order to synthesize LiFe$_{0.98}$PO$_4$ nanoparticles with addition of 4-mol % Na, a mixed powder of Li$_2$CO$_3$, FeC$_2$O$_4$(2H$_2$O) and NH$_4$H$_2$PO$_4$ in a molar ratio of 0.5:0.98:1 was prepared. Fourth, in order to synthesize Li$_{0.95}$FePO$_4$ nano particles with addition of 5-mol % Na, a mixed powder of Li$_2$CO$_3$, FeC$_2$O$_4$(2H$_2$O) and NH$_4$H$_2$PO$_4$ in a molar ratio of 0.475:1:1 was prepared.

In order to add 4- to 5-mol % Na or K to four mixed powders thus prepared, Na$_2$CO$_3$ and K$_2$CO$_3$ were used. According to the same procedure as in preparation of a pure LiFePO$_4$ powder, mixing, milling and drying processes were carried out and the powder mixtures were stored in a glove box filled with argon. Then, each powder aggregate of four mixtures thus prepared was ground in the glove box using a mortar and pestle. Thereafter, each of the mixed powders was placed in an alumina crucible and subjected to first calcination at 350° C. for 2 to 5 hours. In order to prevent oxidation of iron ions due to inflow of oxygen, the heat treatment was carried out with introduction of >99.9% pure argon gas at a flow rate of 400 cc/min, thereby obtaining first synthetic powders.

Figure 2:
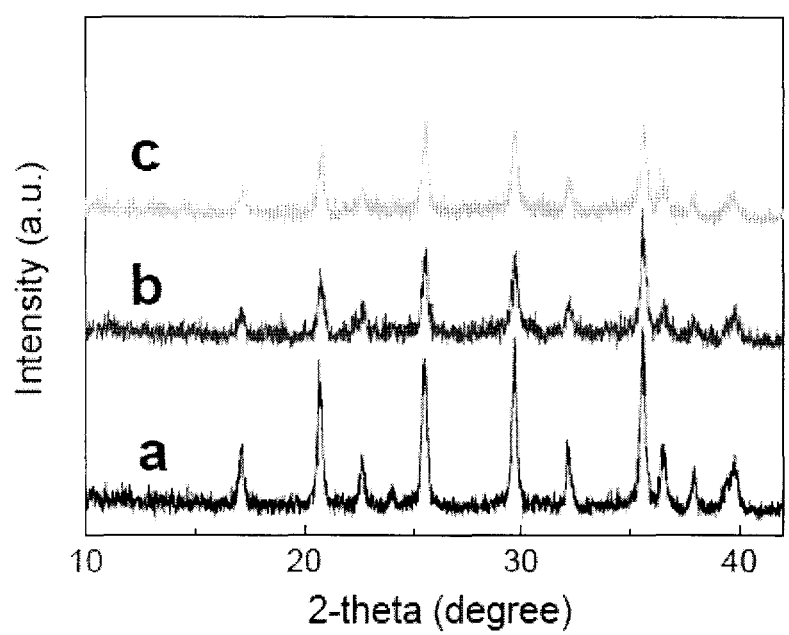
FIG. 2 is a graph showing comparison results of X-ray diffraction patterns for powder samples prepared in Example 1 of the present invention, wherein three samples of $LiFePO_4$ subjected to first calcination at 350° C. are compared therebetween.

FIG. 2 shows the results of X-ray diffraction patterns for synthesized powders. As can be seen in FIG. 2, a LiFePO$_4$ powder without addition of Na or K (FIG. 2a) exhibited relatively strong intensity in X-ray diffraction peaks, whereas the powder with addition of Na (FIG. 2b) and K (FIG. 2c) exhibited very weak intensity in diffraction peaks having a significantly broad full width at a half maximum (FWHM). Therefore, it can be found that the pure LiFePO$_4$ powder (Powder a) already underwent considerable crystallization and particle coarsening during the first calcination. On the other hand, based on the X-ray diffraction results, it is predicted that the powders with addition of Na and K (Powders b and c) mostly remain amorphous due to effects of additives and only some of them are present as small nanocrystalline nuclei.

Figure 3:
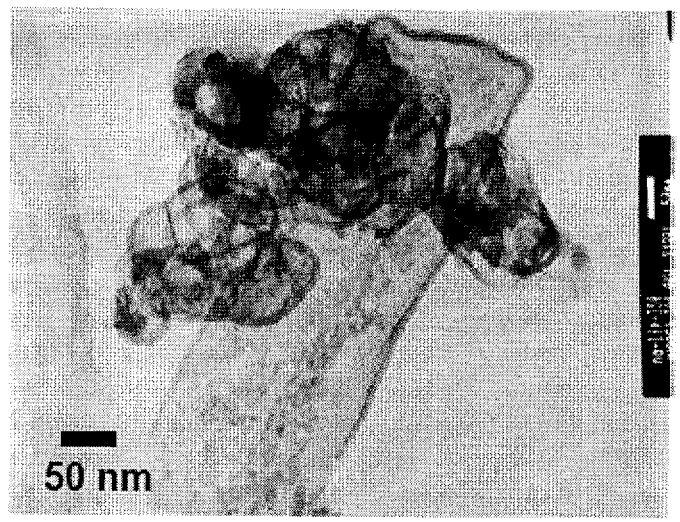
FIG. 3 shows transmission electron micrograph (TEM) images of powder samples after first calcination of $LiFePO_4$ with addition of 4-mol % Na and $LiFePO_4$ with addition of 4-mol % K at 350° C. in Example 1 of the present invention.
Figure 3:
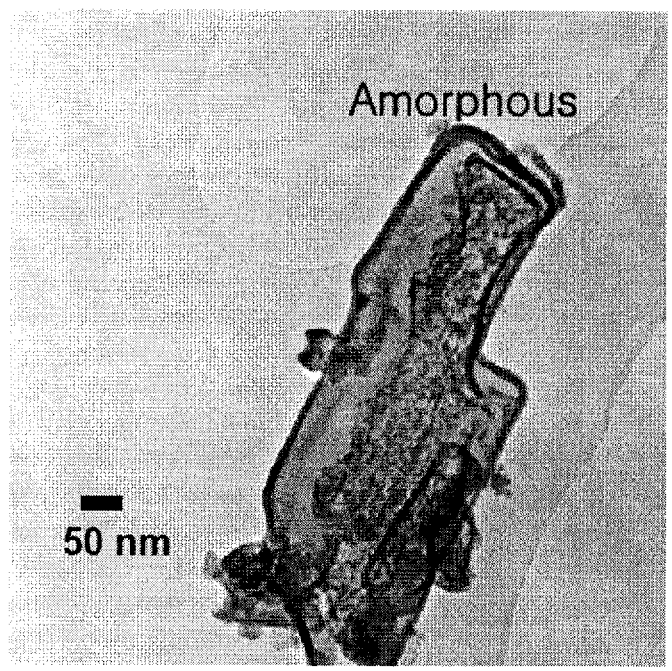

The effect of additives on the crystallization can also be confirmed through direct ex amination using transmission electron microscopy (TEM). FIG. 3 shows TEM images of powders after first calcination of a LiFePO$_4$ powder with addition of 4-mol % Na and a LiFePO$_4$ powder with addition of 4-mol % K at 350° C. As can be seen in FIG. 3, the powders were present as an amorphous phase, although a small amount of nano clusters was observed during the TEM analysis. Further, it can be seen that these results are consistent with the results of X-ray diffraction, as shown in FIG. 2.

In such a manner, the starting materials were subjected to the first heat treatment at 350° C., and the aggregated materials were ground. In order to achieve more uniform distribution of the additives, this was followed by additional grinding for several minutes using a mortar and pestle.

Then, the thus-prepared powder was subjected to a second heat treatment at 450° C. to 500° C. for 2 to 10 hours with introduction of argon at the same flow rate of 400 cc/min, as in the first calcination. The second heat treatment causes gradual formation of crystalline nuclei for a phase transition from an amorphous phase to a crystalline phase, followed by growth of nanoscale particles from the thus formed crystalline nuclei. Therefore, in order to inhibit inhomogeneous coarsening of particles while minimizing a residual amount of the amorphous phase, it is preferred to carry out the heat treatment at a temperature below 500° C. for less than 10 hours.

Figure 4:
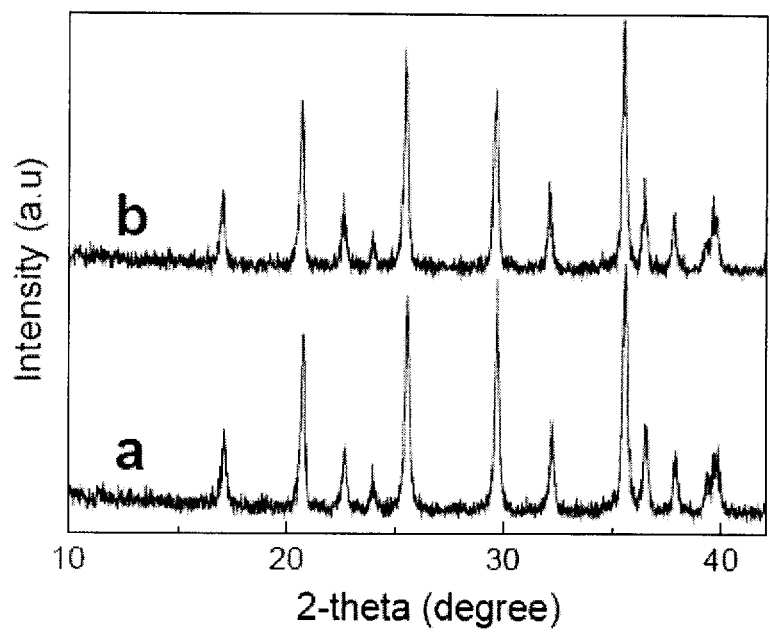
FIG. 4 is a graph showing X-ray diffraction patterns of nanoparticle samples after second calcination of $LiFePO_4$ with addition of 4-mol % Na and $LiFePO_4$ with addition of 4-mol % K at 450° C. in Example 1 of the present invention.

FIG. 4 is a graph showing analysis results of X-ray diffraction patterns for nano particle samples after second heat treatment of a LiFe$_{0.98}$PO$_4$ powder with addition of 4-mol % Na (Powder a) and a LiFe$_{0.98}$PO$_4$ powder with addition of 4-mol % K (Powder b) at 450° C. for 2 to 3 hours. It can be confirmed that both of Powders a and b were synthesized into LiFePO$_4$ having a single-phase olivine structure without formation of a secondary phase.

Figure 5:
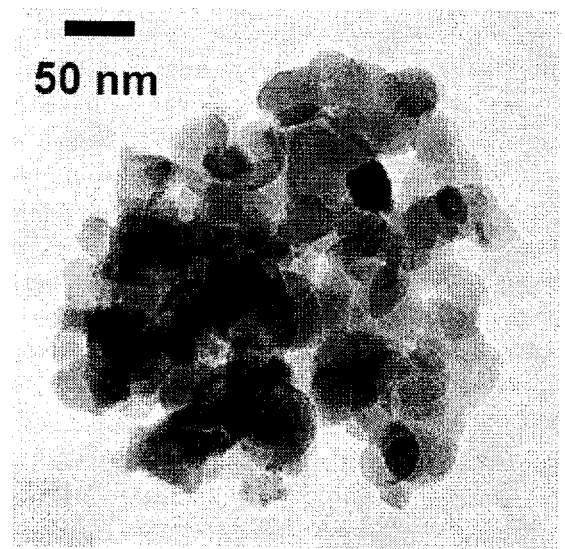
FIG. 5 shows TEM images of powder samples after second calcination of $LiFePO_4$ with addition of 4-mol % Na and $LiFePO_4$ with addition of 4-mol % K at 450° C. for 2 to 3 hours in Example 1 of the present invention.
Figure 5:
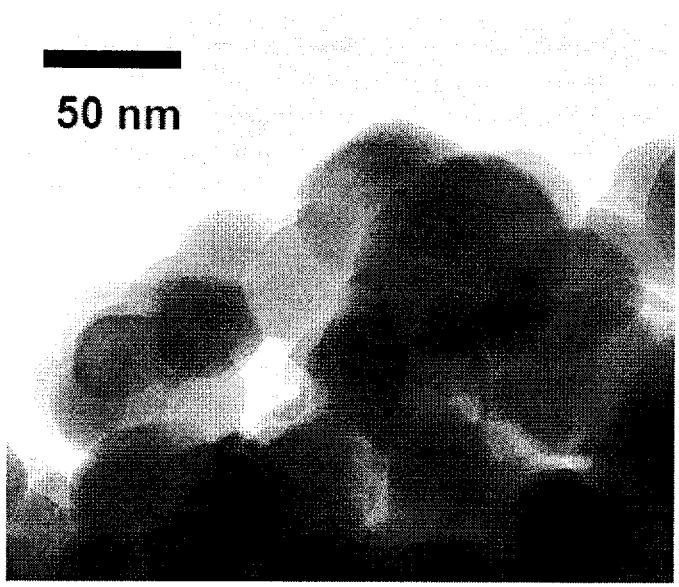

For direct examination of a particle size, FIG. 5 shows a TEM image of particle morphology and size of the LiFePO$_4$ powder. FIG. 5 is a TEM image of powders after second heat treatment of a LiFePO$_4$ powder with addition of 4-mol % Na and a LiFePO$_4$ powder with addition of 4-mol % K at 450° C. for 2 to 3 hours. As can be seen in FIG. 5, it was confirmed that all the powders exhibit a similar size distribution and are composed of nanocrystalline particles having a particle size of less than 50 nm.

Figure 6:
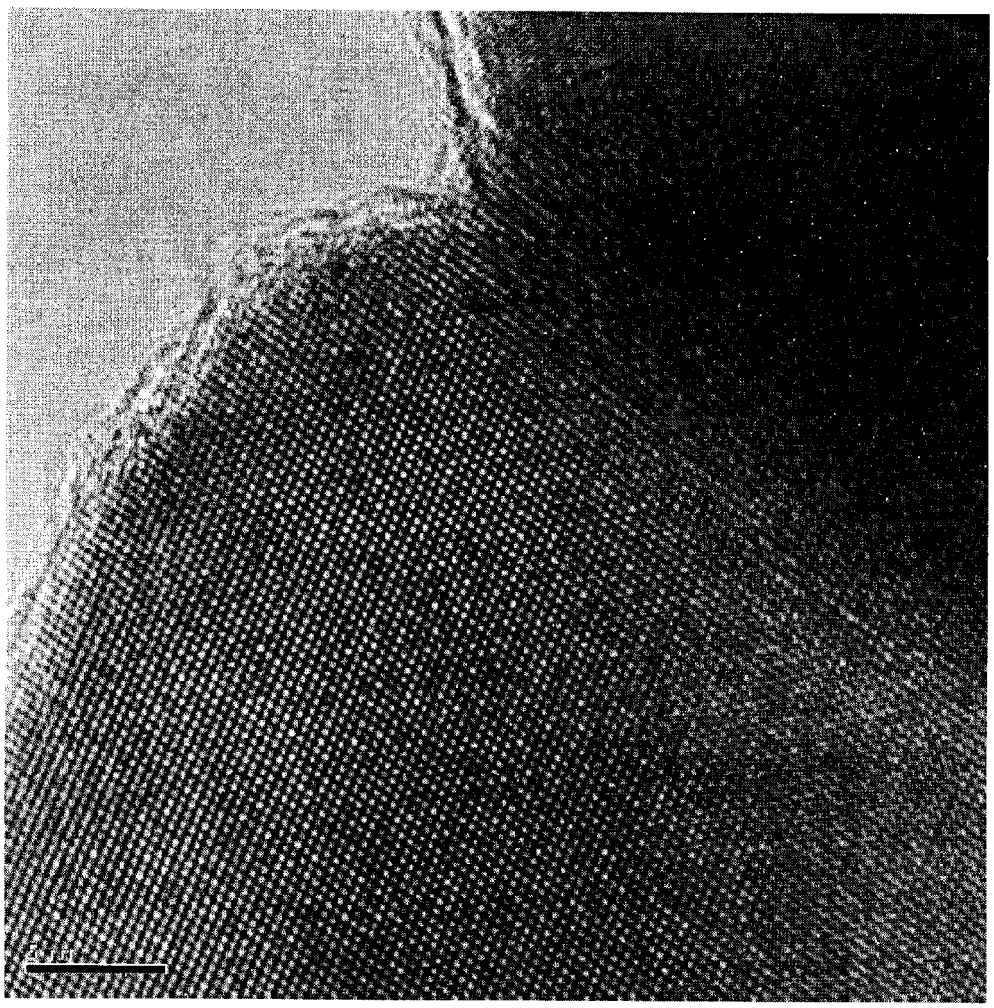
FIG. 6 is a high-resolution TEM (HRTEM) image showing a lattice image of a nano particle sample of $LiFePO_4$ with addition of 4-mol % K prepared in Example 1 of the present invention.

In particular, upon examination of the thus-prepared nanoparticles using HRTEM, it is possible to confirm the crystal lattice of an ordered olivine structure having excellent crystallinity at the atomic level. In order to confirm such characteristics, FIG. 6 shows a HRTEM lattice image of a nanoparticle powder sample of LiFePO$_4$ with addition of 4-mol % K.

More importantly, it is possible to prepare nanoparticles having a particle size of less than 100 nm, even without precise adjustment of the Li:Fe ratio to 1:1, upon preparation of nanoparticles from a mixture of starting materials with addition of Na or K, as shown in the present Example 1. Accordingly, there is a significantly broad non-stoichiometric margin in a chemical composition upon a practical manufacturing process, so advantageously it is possible to synthesize LiFePO$_4$ nanoparticles much more easily and conveniently.

Figure 7:
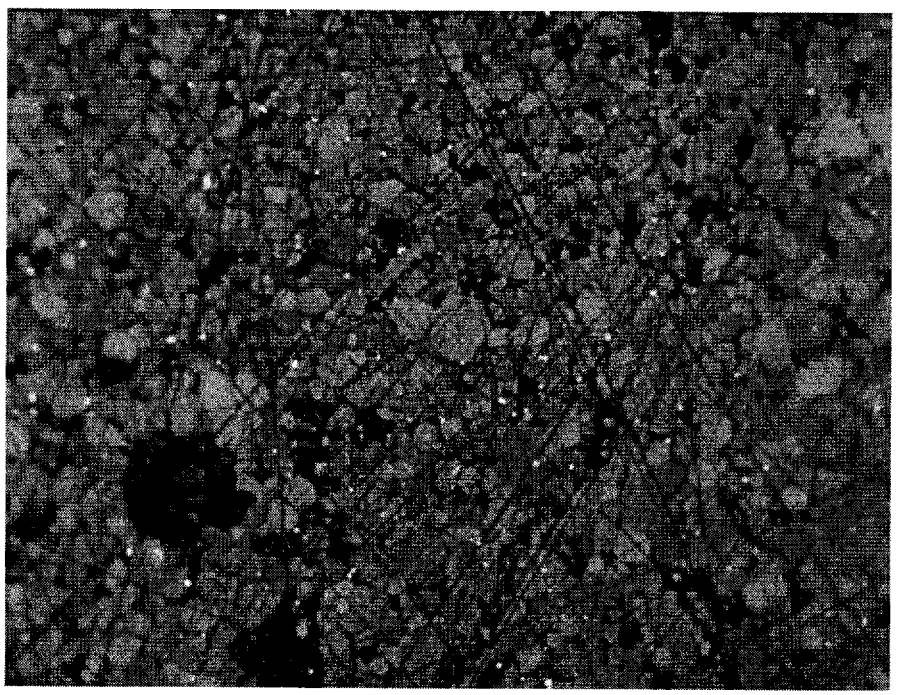
FIG. 7 is an optical micrograph showing a microstructure of polycrystals after second sintering of $LiFePO_4$ with addition of 4-mol % K at 850° C. in Example 1 of the present invention.

The first-calcined powder of LiFe$_{0.98}$PO$_4$ with addition of 4-mol % K was put into a metal mold, and molded into a disk having a diameter of 9 mm and a thickness of 1 mm by application of 6 MPa uniaxial pressure. For the second heat treatment, the thus prepared powder compact was heat-treated at 850° C. under the above-mentioned argon atmosphere for 5 hours to thereby prepare dense polycrystalline pellets having a homogeneous microstructure. FIG. 7 is an optical micrograph showing a microstructure of the polycrystals thus obtained. As shown in FIG. 7, it was confirmed that individual grains have grown to a size of more than 50 µm for a short period of 5 hours at 850° C. Therefore, as mentioned above, upon the second heat treatment at a high temperature of more than 400° C., additive elements such as Na or K serve to facilitate a significantly fast grain growth. These results represent that the temperature and time of the second heat treatment are very important to control the size of final crystal grains.

In order to examine heat treatment conditions and crystal grain sizes for various kinds of nanoparticle powders prepared in Example 1, a size of crystal grains was calculated with main diffraction peaks within the range of 20 to 40 degrees among X-ray diffraction patterns, using the Scherrer equation well known in the art, $d = 0.9 \lambda B \cos \theta$ (d: nanoparticle size, $\lambda$: wavelength of X-rays, B: FWHM of X-ray diffraction peak, and θ: Bragg diffraction angle). The results thus obtained are summarized in Table 1 below.

TABLE 1

| Composition | First calcination | Second heat-treatment | Particle size (nm) |
|---|---|---|---|
| LiFePO$_4$ (undoped) | 350° C. 8 h, Ar | 700° C. 20 h, Ar | N/A(1,000 nm or larger) |
| LiFe$_{0.98}$K$_{0.04}$PO$_4$ | 350° C. 8 h, Ar | 450° C. 4 h, Ar | 40-50 |
| LiFe$_{0.98}$K$_{0.04}$PO$_4$ | 350° C. 8 h, Ar | 500° C. 4 h, Ar | 44-46 |
| LiFe$_{0.98}$K$_{0.04}$PO$_4$ | 350° C. 8 h, Ar | 500° C. 10 h, Ar | 47-59 |
| LiFe$_{0.98}$Na$_{0.04}$PO$_4$ | 350° C. 8 h, Ar | 500° C. 10 h, 95N$_2$—5H$_2$ | 47-55 |
| LiFe$_{0.98}$Na$_{0.04}$PO$_4$ | 350° C. 2 h, Ar | 450° C. 3 h, Ar | 35-42 |
| LiFe$_{0.98}$Na$_{0.04}$PO$_4$ | 350° C. 2 h, Ar | 500° C. 2 h, Ar | 44-55 |
| Li$_{0.95}$Na$_{0.05}$FePO$_4$ | 350° C. 5 h, Ar | 450° C. 2 h, Ar | 39-44 |
| K$_{0.04}$LiFePO$_4$ | 350° C. 5 h, Ar | 450° C. 2 h, Ar | 36-41 |

Example 2

This example is intended to illustrate a process for preparing nanocrystalline particles of LiFePO$_4$ having a starting composition of (Li$_{1-x}$A$_y$)FePO$_4$ or Li(Fe$_{1-x}$A$_y$)PO$_4$ (A=La, Ce, Pr, Nd, Sm, Gd, or Er, 0<x≦0.1, and 0<y≦0.1) with addition of lanthanide elements such as La, Ce, Pr, Nd, Sm, Gd and Er.

Starting material powders used for preparation of the LiFePO$_4$ nanocrystalline particles were Li$_2$CO$_3$, FeC$_2$O$_4$ (2H$_2$O), and NH$_4$H$_2$PO$_4$, as in Example 1. The powders used as additives were Ce$_2$(C$_2$O$_4$)$_3$(9H$_2$O), Nd$_2$(C$_2$O$_4$)$_3$(5H$_2$O), Gd$_2$(C$_2$O$_4$)$_3$(5H$_2$O), and Er$_2$(C$_2$O$_4$)$_3$(5H$_2$O). Three starting material powders and additive powders were 99.5% pure or higher.

In order to synthesize four LiFePO$_4$ powders with addition of each additive element of Ce, Nd, Gd and Er in an amount of 2 mol %, using the aforesaid oxalates, a powder of Li$_2$CO$_3$, FeC$_2$O$_4$(2H$_2$O) and NH$_4$H$_2$PO$_4$ in a molar ratio of 0.5:1:1 was prepared. Then, these materials in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of four mixtures thus prepared was ground in the glove box using a mortar and pestle, in the same manner as in Example 1. Thereafter, each of the mixed powders was placed in an alumina crucible and subjected to first calcination at 350° C. for 8 hours. In order to prevent oxidation of iron ions due to inflow of oxygen, the heat treatment was carried out with introduction of >99.9% pure argon gas at a flow rate of 400 cc/min, thereby obtaining a first synthetic powder.

In such a manner, the starting materials were subjected to the first heat treatment at 350° C., and the aggregated materials were ground. In order to achieve more uniform distribution of the additives, this was followed by additional grinding for several minutes using a mortar and pestle.

Then, the thus-prepared powder was subjected to a second heat treatment at 500° C. for 10 hours with introduction of argon at the same flow rate of 400 cc/min, as in the first calcination. As shown in Example 1 with addition of alkali elements, the second heat treatment also causes gradual formation of crystalline nuclei for a phase transition from an amorphous phase to a crystalline phase, followed by growth of nanoscale particles from the thus formed crystalline nuclei.

Figure 8:
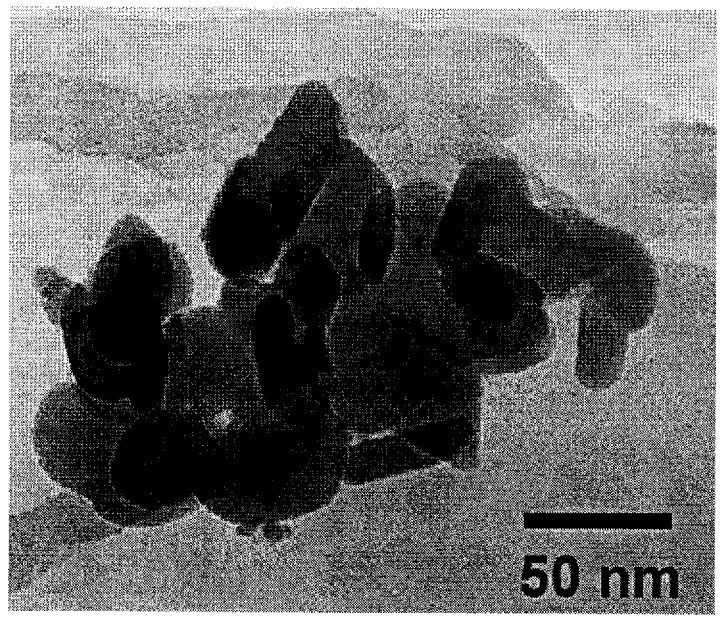
FIG. 8 shows TEM images of powder samples after second heat treatment of $LiFePO_4$ with addition of 2-mol % Er and $LiFePO_4$ with addition of 2-mol % Ce at 500° C. in Example 2 of the present invention.
Figure 8:
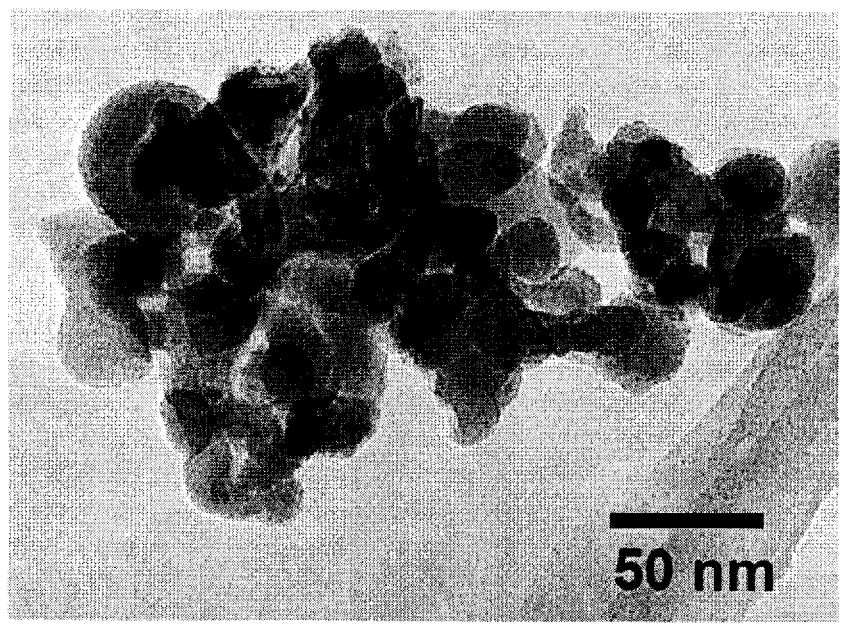

From X-ray diffraction analysis for samples of powders subjected to the second heat treatment as above, it can be confirmed that all the powders were synthesized into LiFePO$_4$ having a single-phase olivine structure without formation of a secondary phase. For direct examination of a particle size, the powders were observed using TEM. FIG. 8 shows TEM images of particle morphology and size of the LiFePO$_4$ powders.

FIG. 8 is TEM images of powders after second heat treatment of a LiFePO$_4$ powder with addition of 2-mol % Er and a LiFePO$_4$ powder with addition of 2-mol % Ce at 500° C. As can be seen in FIG. 8, it was confirmed that all the powders have a similar size distribution and are composed of nanocrystalline particles having a particle size of less than 50 nm.

Figure 9:
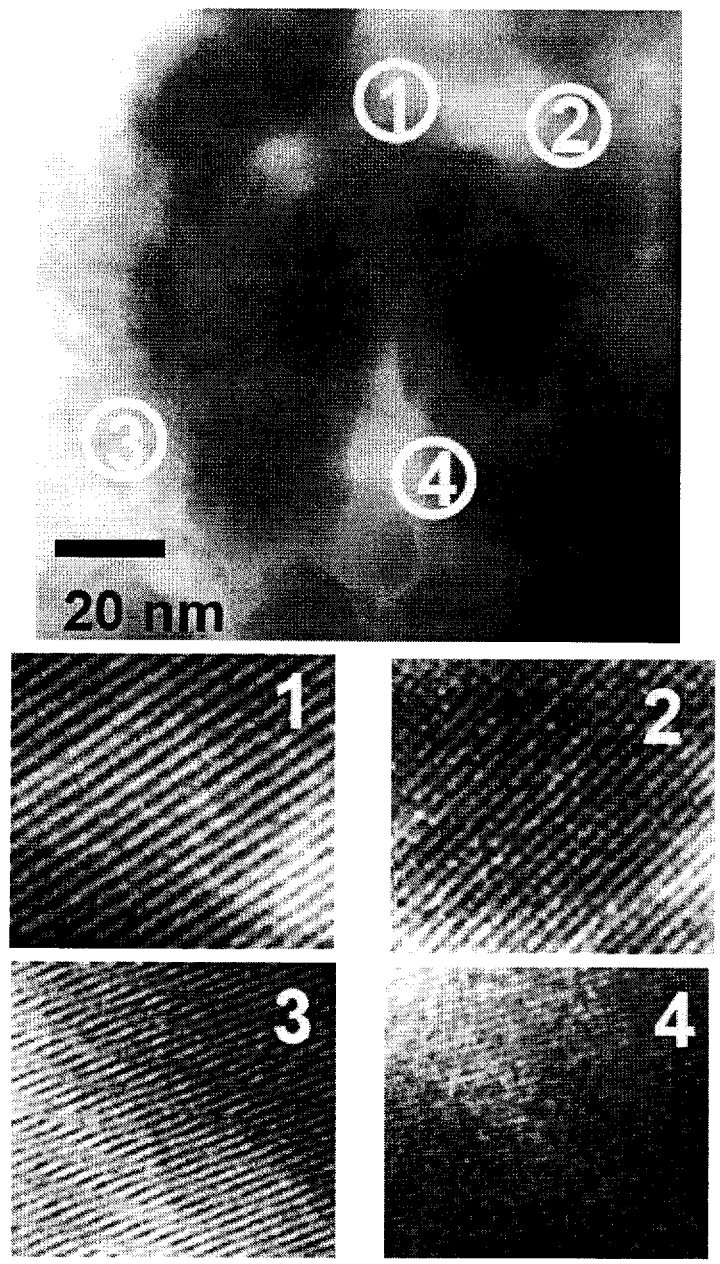
FIG. 9 shows a TEM image of nanoparticle samples obtained after second heat treatment of $LiFePO_4$ with addition of 2-mol % Er at 500° C. in Example 2 of the present invention, and HRTEM images representing different lattice images of $LiFePO_4$ in aggregated regions.

In particular, upon high-resolution lattice imaging of the thus-prepared nanoparticles at a unit of 10 to 20 nm in the aggregated region of particles, it can be confirmed that particles of each region have different crystal lattice orientations, as shown in FIG. 9. Therefore, it can be seen that the powder consists of very small nanoscale crystallites.

In order to examine heat treatment conditions and crystal grain sizes for various kinds of nanoparticle powders prepared in this Example 2, a size of crystal grains was calculated with main diffraction peaks within the range of 20 to 40 degrees, among X-ray diffraction patterns, using the same Scherrer equation as in Example 1. The results thus obtained are summarized in Table 2 below.

TABLE 2

| Composition | First calcination | Second heat treatment | Particle size (nm) |
|---|---|---|---|
| Nd$_{0.02}$LiFePO$_4$ | 350° C. 8 h, Ar | 500° C. 10 h, Ar | 30-38 |
| Er$_{0.02}$LiFePO$_4$ | 350° C. 8 h, Ar | 500° C. 10 h, Ar | 31-38 |
| Er$_{0.02}$LiFePO$_4$ | 350° C. 8 h, Ar | 600° C. 10 h, Ar | 36-47 |
| Gd$_{0.02}$LiFePO$_4$ | 350° C. 8 h, Ar | 500° C. 10 h, Ar | 32-35 |
| Gd$_{0.02}$LiFePO$_4$ | 350° C. 8 h, Ar | 600° C. 10 h, Ar | 40-45 |
| Li$_{0.95}$Ce$_{0.02}$FePO$_4$ | 350° C. 8 h, Ar | 500° C. 10 h, Ar | 33-38 |
| LiFe$_{0.98}$Ce$_{0.02}$PO$_4$ | 350° C. 5 h, Ar | 500° C. 10 h, Ar | 33-44 |
| LiFe$_{0.98}$Ce$_{0.02}$PO$_4$ | 350° C. 5 h, Ar | 600° C. 10 h, Ar | 44-49 |

Example 3

This example is intended to illustrate a process for preparing nanocrystalline particles of LiFePO$_4$ having a starting composition of (Li$_{1-x}$A$_y$)FePO$_4$ (A=K or Na, 0<x≦0.5, and 0<y≦0.1) with addition of alkali elements as additives. That is, Example 3 is to provide details for a method for controlling patterns of changes in overall phase formation and nanoparticle formation with a varying non-stoichiometry of Li ions, by controlling a non-stoichiometry of Li up to 50%.

Starting material powders used for preparation of the LiFePO$_4$ nanocrystalline particles were Li$_2$CO$_3$, FeC$_2$O$_4$ (2H$_2$O), and NH$_4$H$_2$PO$_4$, as in Examples 1 and 2. The powder used as an additive was K$_2$CO$_3$. The starting material powders and the additive powder were all 99.5% pure or higher.

In the present Example 3, four LiFePO$_4$ powders each with addition of 4-mol % K and having a different content of Li were prepared. For this purpose, mixed powders were prepared according to the same procedure as in Examples 1 and 2. First, in order to synthesize a LiFePO$_4$ powder with addition of 4-mol % K, a mixed powder of Li$_2$CO$_3$, FeC$_2$O$_4$ (2H$_2$O) and NH$_4$H$_2$PO$_4$ in a molar ratio of 0.5:1:1 was prepared. Second, in order to synthesize a Li$_{0.85}$FePO$_4$ powder with addition of 4-mol % K, a mixed powder of Li$_2$CO$_3$, $FeC_2O_4(2H_2O)$ and $NH_4H_2PO_4$ in a molar ratio of 0.425:1:1 was prepared. Third, in order to synthesize a $Li_{0.70}FePO_4$ powder with addition of 4-mol % K, a mixed powder of $Li_2CO_3$, $FeC_2O_4(2H_2O)$ and $NH_4H_2PO_4$ in a molar ratio of 0.35:1:1 was prepared. Fourth, in order to synthesize a $Li_{0.50}FePO_4$ powder with addition of 4-mol % K, a mixed powder of $Li_2CO_3$, $FeC_2O_4(2H_2O)$ and $NH_4H_2PO_4$ in a molar ratio of 0.25:1:1 was prepared.

Then, four mixed powders thus prepared in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of four mixtures thus prepared was ground in the glove box using a mortar and pestle, in the same manner as in Examples 1 and 2. Thereafter, each of the mixed powders was placed in an alumina crucible and subjected to first calcination at 350° C. for 5 hours. In order to prevent oxidation of iron ions due to inflow of oxygen, the heat treatment was carried out with introduction of >99.9% pure argon gas at a flow rate of 400 cc/min, thereby obtaining a first synthetic powder.

In such a manner, the starting materials were subjected to the first heat treatment at 350° C., and the aggregated materials were ground. In order to achieve more uniform distribution of the additives, this was followed by additional grinding for several minutes using a mortar and pestle. Then, the thus-prepared powder was subjected to a second heat treatment at 450° C. for 3 hours with introduction of argon at the same flow rate of 400 cc/min, as in the first calcination.

Figure 10:
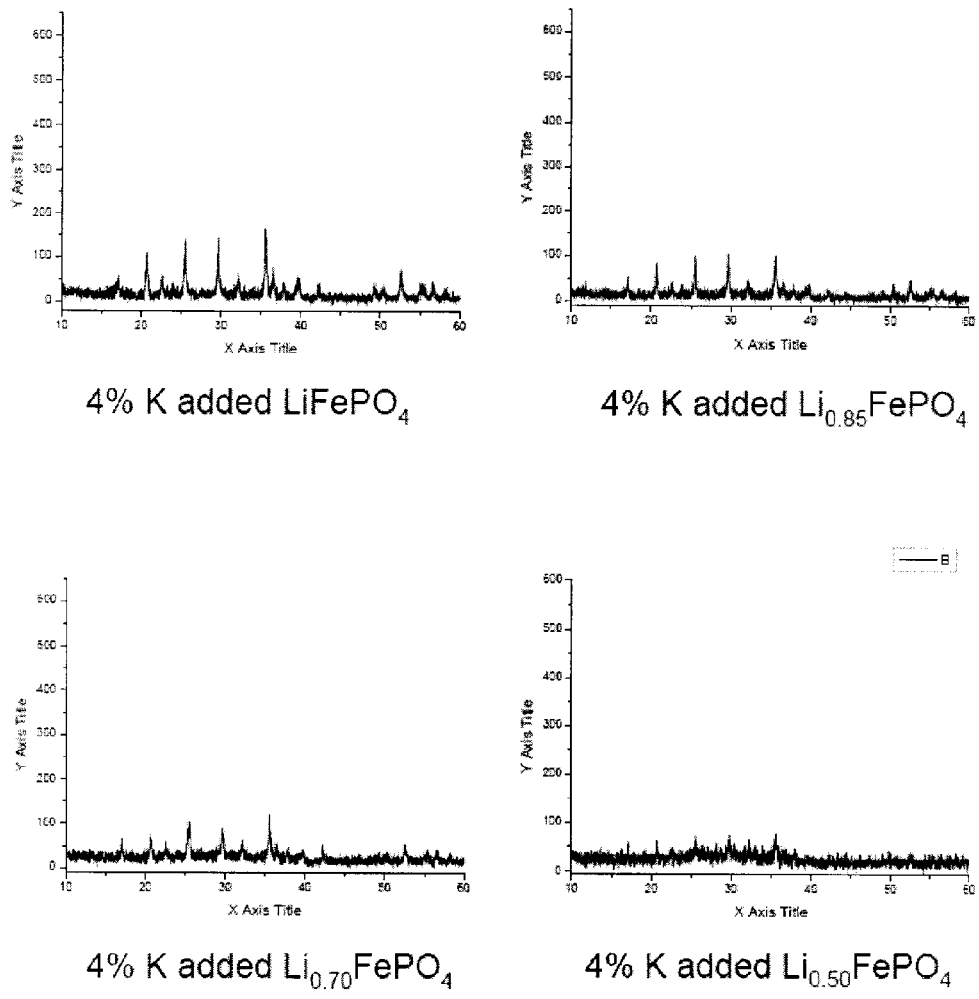
FIG. 10 is graphs showing X-ray diffraction patterns of powder samples obtained after first calcination of $LiFePO_4$ with addition of 4-mol % K at 350° C. with various stoichiometric ratios of lithium in Example 3 of the present invention.
Figure 11:
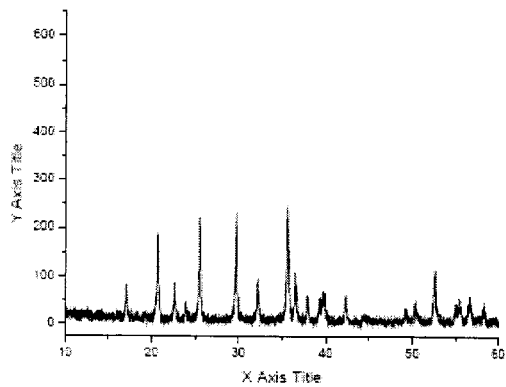
FIG. 11 is graphs showing X-ray diffraction patterns of powder samples obtained after second calcination of $LiFePO_4$ with addition of 4-mol % K at 450° C. with various stoichiometric ratios of lithium in Example 3 of the present invention.
Figure 11:
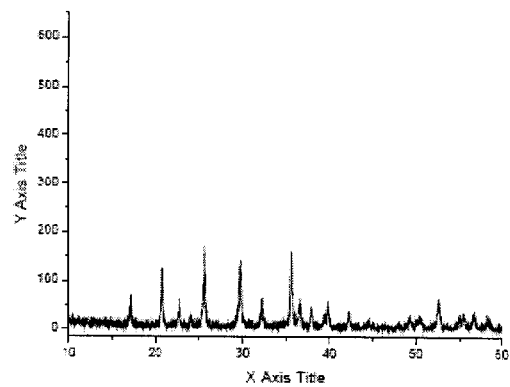
Figure 11:
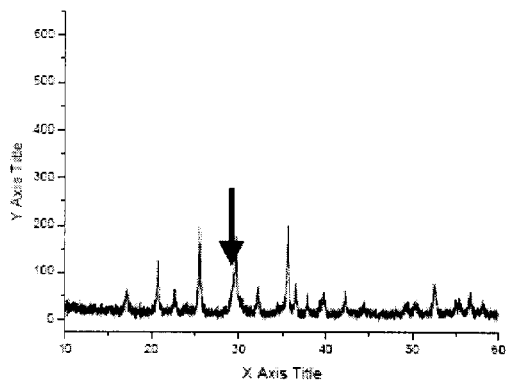
Figure 11:
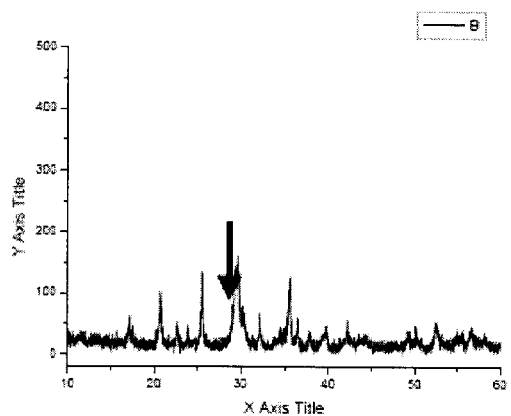

FIG. 10 shows X-ray diffraction patterns for four different powder samples subjected to first heat treatment at 350° C. for 5 hours, as described above. As shown in FIG. 10, a decreasing amount of Li leads to a decrease in the intensity of diffraction peaks and a gradual broadening in FWHM, as compared to the sample having the exact 1:1 stoichiometry of Li:Fe. That is, a decreasing amount of added lithium results in a decrease in amounts and numbers of nanoclusters which serve as nuclei for growth of crystals. As a result, it can be seen that the fourth $Li_{0.50}FePO_4$ powder with 50% Li-deficiency consists substantially of an amorphous phase. Therefore, it can be seen that more preferred is to appropriately control an addition amount of Li to be smaller than an amount of Fe, in order to prevent unwanted formation of heterogeneously coarsened crystal particles by suppression of inhomogeneous nucleation which may occur upon the first heat treatment, FIG. 11 shows X-ray diffraction patterns of these powder samples subjected to second heat treatment at 450° C. for 3 hours. As shown in FIG. 11, the $Li_{0.85}FePO_4$ powder with 15% Li-deficiency exhibited X-ray diffraction results of a single phase without formation of any secondary phase. On the other hand, it can be seen that formation of a secondary phase corresponding to $Fe_2P_2O_7$ occurs as indicated by an arrow, from the $Li_{0.70}FePO_4$ powder with 30% Li-deficiency. In other words, upon considering the fact that the $Li_{0.85}FePO_4$ powder with about 15% Li-deficiency also exhibits no formation of any secondary phase, it can be seen that the difference in charge disproportionation is compensated by transition of valance state of 15% of Fe ions from 2+ to 3+. Therefore, these results show a close relationship with the fact that an excellent electrical conductivity is achieved by the electron hole transfer, as mentioned before.

In order to examine heat treatment conditions and crystal grain sizes for various kinds of nanoparticle powders prepared in the present Example 3, a size of crystal grains was calculated with main diffraction peaks within the range of 20 to 40 degrees, among X-ray diffraction patterns, using the same Scherrer equation as in Example 1. The results thus obtained are summarized in Table 3 below. In particular, a decrease in an amount of added lithium leads to a decrease in a size of crystal grains. Therefore, in order to prepare particles having a smaller particle size, it is preferred to appropriately control an amount of lithium.

TABLE 3

| Composition | First calcination | Second heat treatment | Particle size (nm) |
|---|---|---|---|
| $K_{0.04}LiFePO_4$ | 350° C. 5 h, Ar | 450° C. 2 h, Ar | 36-41 |
| $K_{0.04}Li_{0.85}FePO_4$ | 350° C. 5 h, Ar | 450° C. 3 h, Ar | 34-45 |
| $K_{0.04}Li_{0.70}FePO_4$ | 350° C. 5 h, Ar | 450° C. 3 h, Ar | 23-47 |
| $K_{0.04}Li_{0.70}FePO_4$ | 350° C. 5 h, Ar | 600° C. 5 h, Ar | 27-47 |
| $K_{0.04}Li_{0.50}FePO_4$ | 350° C. 5 h, Ar | 450° C. 3 h, Ar | 12-22 |
| $K_{0.04}Li_{0.50}FePO_4$ | 350° C. 5 h, Ar | 600° C. 5 h, Ar | 12-25 |

Example 4

This example is intended to illustrate a process for preparing nanocrystalline particles of lithium metal phosphate containing a transition metal other than Fe, such as Mn, Co, and the like, in addition to nanocrystalline particles of lithium metal phosphates exemplified in Examples 1 to 3. That is, this example illustrates a process for preparing nanoparticles of lithium transition metal phosphate having a starting composition of $(Li_{1-x}A_x)MPO_4$=K, Na or a lanthanide element, M=Fe, Mn or Co, $0<x\leq0.1$, and $0<y\leq0.1$) with addition of an alkali element such as K or Na or a lanthanide element as an additive.

Starting material powders used for preparation of nanoparticles of lithium transition metal phosphate were $Li_2CO_3$, $FeC_2O_4(2H_2O)$, and $NH_4H_2PO_4$, as in Examples 1 and 2. $MnC_2O_4(2H_2O)$ and $CoC_2O_4(2H_2O)$ were used as source materials of Mn and Co, respectively. Further, the powder used as an additive was $K_2CO_3$. The starting material powders and the additive powder were all 99.5% pure or higher.

In the present Example 4, nanocrystalline particles of lithium metal phosphates each with addition of 5-mol % K and containing a different transition metal, e.g. $Li_{0.95}FePO_4$, $Li_{0.95}MnPO_4$, and $Li_{0.95}CoPO_4$, were synthesized. For this purpose, mixed powders were prepared according to the same procedure as in Examples 1 and 2. First, in order to synthesize a $Li_{0.95}FePO_4$ powder with addition of 5-mol % K, a mixed powder of $Li_2CO_3$, $FeC_2O_4(2H_2O)$ and $NH_4H_2PO_4$ in a molar ratio of 0.475:1:1 was prepared. Second, in order to synthesize a $Li_{0.95}MnPO_4$ powder with addition of 5-mol % K, a mixed powder of $Li_2CO_3$, $MnC_2O_4(2H_2O)$ and $NH_4H_2PO_4$ in a molar ratio of 0.475:1:1 was prepared. Third, in order to synthesize a $Li_{0.95}CoPO_4$ powder with addition of 5-mol % K, a mixed powder of $Li_2CO_3$, $CoC_2O_4(2H_2O)$ and $NH_4H_2PO_4$ in a molar ratio of 0.475:1:1 was prepared. As exhibited in Example 3, a decrease in an amount of added lithium leads to a decrease in a size of crystal grains. Therefore, a non-stoichiometry of lithium was appropriately adjusted to a value of 0.95 to thereby achieve formation and growth of nuclei having a uniform particle size during the heat treatment process.

Then, three mixed powders thus prepared in conjunction with zirconia ceramic balls were placed in a zirconia milling jar and wet-milled in an acetone (99.9% pure) solvent for 24 hours, followed by grinding and mixing. Immediately after drying to completely remove the acetone solvent, the contents were placed and stored in a glove box filled with argon so as to prevent oxidation of the materials which may occur upon contact with the air.

Then, each powder aggregate of three mixtures thus prepared was ground in the glove box using a mortar and pestle, in the same manner as in Examples 1 and 2. Thereafter, each of the mixed powders was placed in an alumina crucible and subjected to first calcination at 350° C. for 5 hours. In order to prevent oxidation of Fe, Mn or Co ions due to inflow of oxygen, the heat treatment was carried out with introduction of >99.9% pure argon gas at a flow rate of 400 cc/min, thereby obtaining a first synthetic powder.

In such a manner, the starting materials were subjected to the first heat treatment at 350° C., and the aggregated materials were ground. In order to achieve more uniform distribution of the additives, this was followed by additional grinding for several minutes using a mortar and pestle. Then, the thus-prepared powder was subjected to a second heat treatment at a temperature of 450° C. for 1 to 2 hours with introduction of argon at the same flow rate of 400 cc/min, as in the first calcination.

Figure 12:
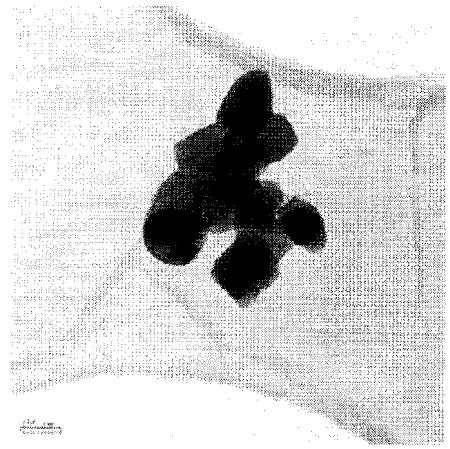
FIG. 12 shows TEM images of nanoparticle samples obtained after second heat treatment of lithium iron phosphate, lithium manganese phosphate and lithium cobalt phosphate each with addition of 5-mol % Na at 450° C. in Example 4 of the present invention.
Figure 12:
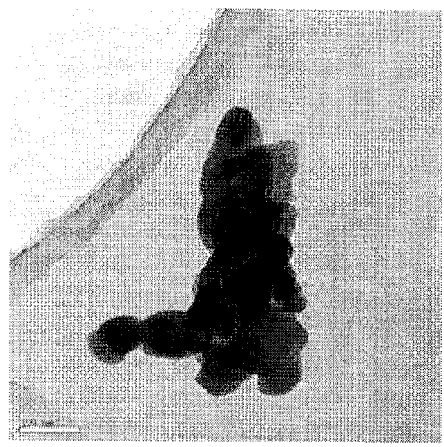
Figure 12:
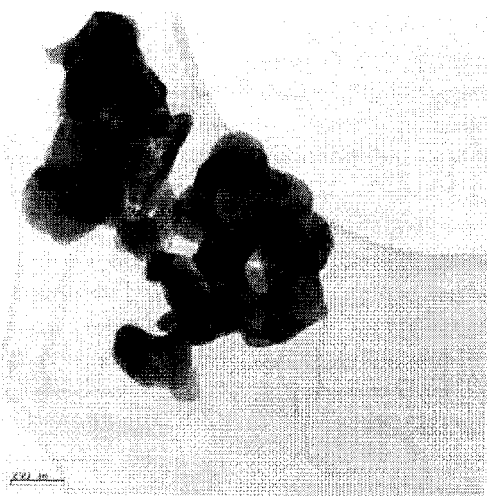

FIG. 12 shows TEM images for nanocrystalline particles of lithium metal phosphates of $Li_{0.95}FePO_4$, $Li_{0.95}MnPO_4$, and $Li_{0.95}CoPO_4$ each with addition of 5-mol % K prepared in the present Example 4. As shown in FIG. 12, it can be seen that all the samples exhibited formation of nanoparticles having an average particle size of less than 100 nm. Therefore, it is possible to easily prepare fine nanoparticles of lithium transition metal phosphate ($LiMPO_4$) having a particle size of less than 100 nm by a heat treatment process at a low temperature for a very short period of time via the addition of alkali elements such as Na and K and lanthanide elements, unlike a conventional method.

Figure 13:
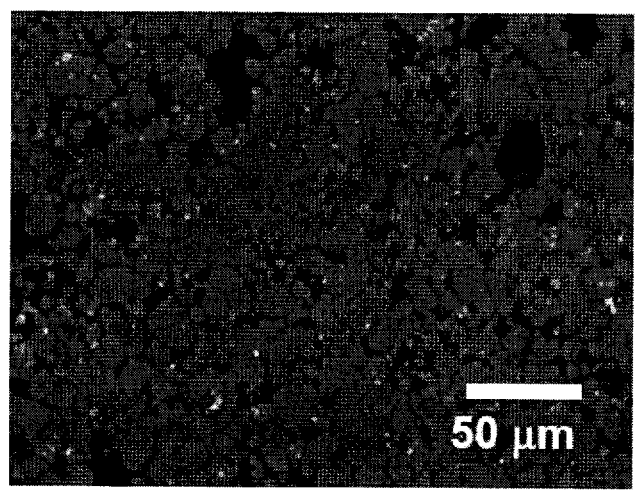
FIG. 13 is an optical micrograph showing a microstructure of polycrystals obtained after second sintering of lithium cobalt phosphate with addition of 4-mol % Na at 700° C. in Example 4 of the present invention.

Further, consistently with the results of Example 1, additives such as alkali elements (including Na and K) and lanthanide elements serve to facilitate growth of particles as the second heat treatment temperature increases. FIG. 13 is a light micrograph showing a microstructure of polycrystals of lithium cobalt phosphate prepared according to the same manner. That is, $LiCo_{0.98}PO_4$ with addition of 4-mol % Na was subjected to the second heat treatment at 700° C. for 20 hours to thereby prepare polycrystals having a homogeneous microstructure. As shown in FIG. 13, it was confirmed that the thus-prepared dense pellet samples have a particle size of several tens of μm. These results were consistent with a microstructure photograph of Example 1 as shown in FIG. 7.

In order to examine heat treatment conditions and crystal grain sizes for various kinds of nanoparticle powders prepared in this Example 4, a size of crystal grains was calculated with main diffraction peaks within the range of 20 to 40 degrees, among X-ray diffraction patterns, using the same Scherrer equation as in Example 1. The results thus obtained are summarized in Table 4 below.

TABLE 4

| Composition | First calcination | Second heat treatment | Particle size (nm) |
| --- | --- | --- | --- |
| $Li_{0.95}Na_{0.05}FePO_4$ | 350° C. 5 h, Ar | 450° C. 2 h, Ar | 39-44 |
| $Li_{0.95}Na_{0.05}CoPO_4$ | 350° C. 5 h, Ar | 450° C. 1 h, Ar | 64-72 |
| $Li_{0.95}Na_{0.05}MnPO_4$ | 350° C. 5 h, Ar | 450° C. 2 h, Ar | 42-56 |
| $LiMn_{0.95}Na_{0.05}PO_4$ | 350° C. 8 h, Ar | 500° C. 2 h, Ar | 47-52 |
| $LiCo_{0.98}Na_{0.04}PO_4$ | 350° C. 2 h, Ar | 450° C. 3 h, Ar | 49-61 |

Analysis Example 1

This example demonstrates through direct observation that it is possible to easily prepare nanoparticles of lithium transition metal phosphate ($LiMPO_4$) (M=Fe, Mn, Co, Ni, Ti, Cu or any combination thereof) with addition of alkali elements and lanthanide elements as proposed by the present invention. For this purpose, in-situ TEM observation was directly carried out for formation of nanoparticles of $LiFePO_4$ at a heat treatment temperature above 400° C.

As a powder sample used in the present Analysis Example 1, one of the powders prepared in Example 1 was selected. As the $LiFePO_4$ with addition of 4-mol % K, a powder sample, which was subjected to a first heat treatment at 350° C. for 5 hours, was directly observed for formation and growth of nanoparticles with TEM in real time at a high temperature. For such an analysis, in situ high-resolution images were continuously taken at 450° C. under an electron microscope with an accelerating voltage of 1,250 keV, using a specimen holder including a device for heating a specimen to a high temperature.

Figure 14:
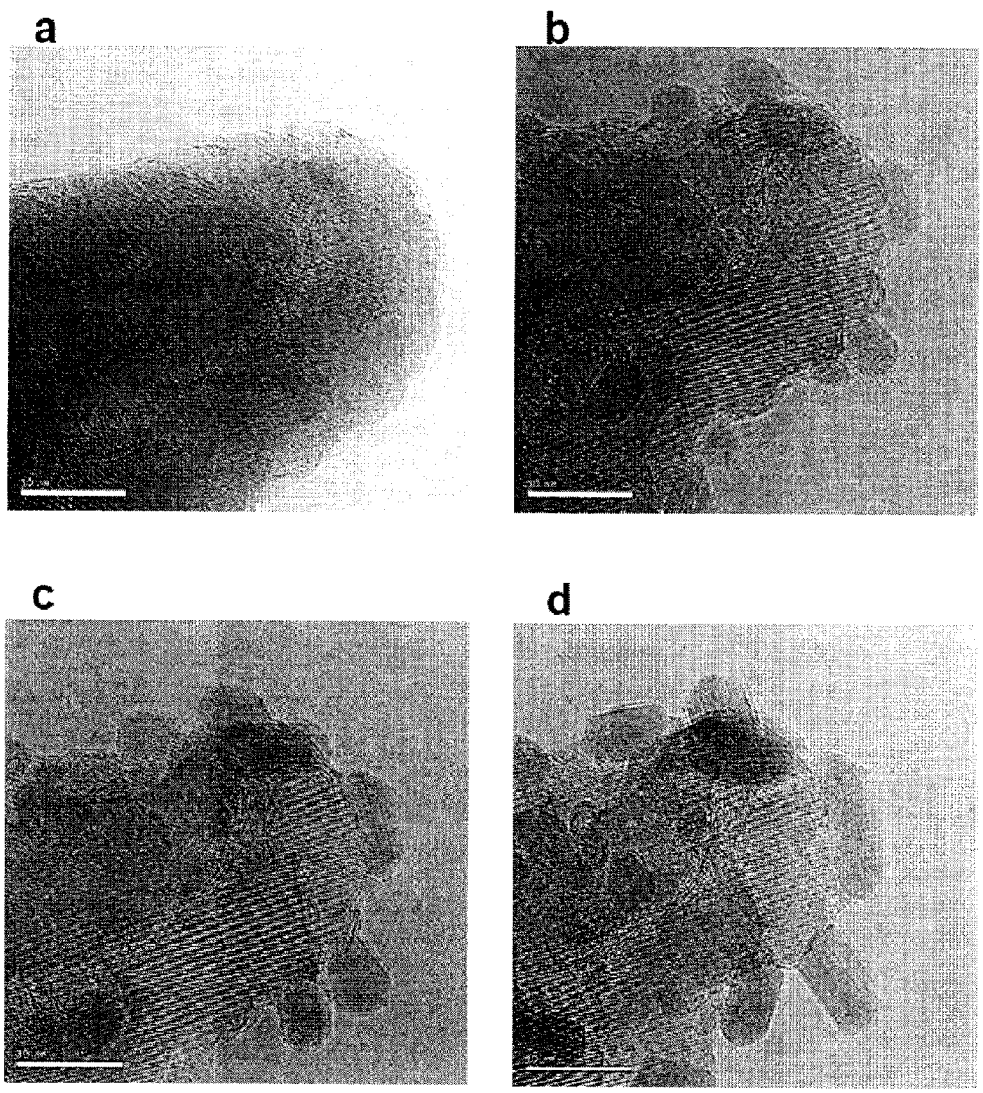
FIG. 14 shows HRTEM images representing a formation process of nanoparticles taken under a transmission electron microscope in Analysis Example 1 of the present invention.

FIG. 14 shows a series of high-resolution images observed in real time for formation and growth of nanoparticles at 450° C. under a transmission electron microscope, using a powder sample of amorphous $LiFePO_4$ with addition of 4-mol % K, which was subjected to the first heat treatment at 350° C. for 5 hours. In order to stabilize the drift of the sample due to thermal expansion at a high temperature, Image "a" was obtained after the sample was maintained for 20 min. FIGS. 14b, 14c and 14d are high-resolution images taken for the same region after 15 min, 20 min and 35 min, respectively. As shown in FIG. 14a, it can be seen that formation and differentiation of crystalline nuclei having a size of several nanometers take place within the entire amorphous phase at the initial stage of heat treatment. Further, FIGS. 14b, 14c and 14d directly demonstrate that such nuclei undergo gradual and uniform growth with heat-treatment time, thereby forming crystal particles having a particle size of several tens of nanometers.

Analysis Example 2

As mentioned hereinbefore, in the unit lattice of the $LiMPO_4$ (M=Fe, Mn, Co, Ni, Ti, Cu or any combination thereof), Li is positioned in oxygen octahedral interstitials of the M' site, and M is positioned in oxygen octahedral interstitials of the M" site, thus forming an ordered olivine structure. Therefore, if transition metal ions are positioned in the M' sites where Li ions are present, this may interfere with migration of Li ions in the b-axis direction, which thereby inhibits fast diffusion of Li ions during the intercalation reaction. Consequently, such anti-site defects cause deterioration of discharge capacity and output power properties when the lithium transition metal phosphates are used as electrode materials in the lithium-ion secondary batteries. Accordingly, it is very important to prepare the $LiMPO_4$ having a crystallographically ordered cation arrangement.

In connection with particles of the $LiMPO_4$ with addition of alkali elements and lanthanide elements, prepared by the process of the present invention, the present Analysis Example 2 presents the direct atomic-level observation for an ordered arrangement between cations inside the crystal lattices, using a high-angle annular dark field (HAADF) scanning TEM imaging which is one of the most up-to-date electron microscopy techniques. The present Analysis Example 2 is intended to demonstrate that crystalline particles of the LiMPO$_4$ prepared in the present invention have excellent cation ordering between Li and M.

As the specimen for the HAADF-STEM examination, one of the powder samples prepared in Example 1 was used. A powder sample of LiFePO$_4$ with addition of 4-mol % K subjected to the first calcination at 350° C. for 5 hours was put into a metal mold, and compacted into a disk having a diameter of 9 mm and a thickness of 1 mm by application of 6 MPa pressure. For the second heat treatment, the thus-prepared powder compact was sintered at 700° C. under the same argon atmosphere for 5 hours to thereby prepare polycrystalline samples having a homogeneous microstructure. Based on the typical TEM specimen preparation of polycrystalline samples, A densely sintered pellet was ground up to a thickness of 100 μm and then ultrasonically cut into a disk having a diameter of 3 mm. The resulting disk samples were subjected to dimpling and finally ion-milling to thereby prepare a thin section for electron transparency for TEM.

The high-resolution lattice image, which can be observed with conventional TEM, may exhibit different lattice patterns even for the same specimen, depending upon a specimen thickness and a defocus length of an objective lens (D. B. Williams and C. B. Carter, "*Transmission Electron Microscopy, A Textbook for Materials Science* (Part 3. Imaging)", Plenum Press, 1996). Therefore, in order to correctly probe a position of atomic columns, an atomic-level observation should be made using Z-contrast STEM based on HAADF imaging which enables to visualize the atomic columns of the lattice (M. Varela et al., *Annu. Rev. Mater. Res.*, Vol. 35, p. 539 (2005)). This method, literally, shows the contrast of the image according to the atomic number, Z, and can identify crystal lattices at the atomic level, because a heavier atom, e.g., an atom with a higher atomic number, exhibits a brighter contrast.

Figure 15:
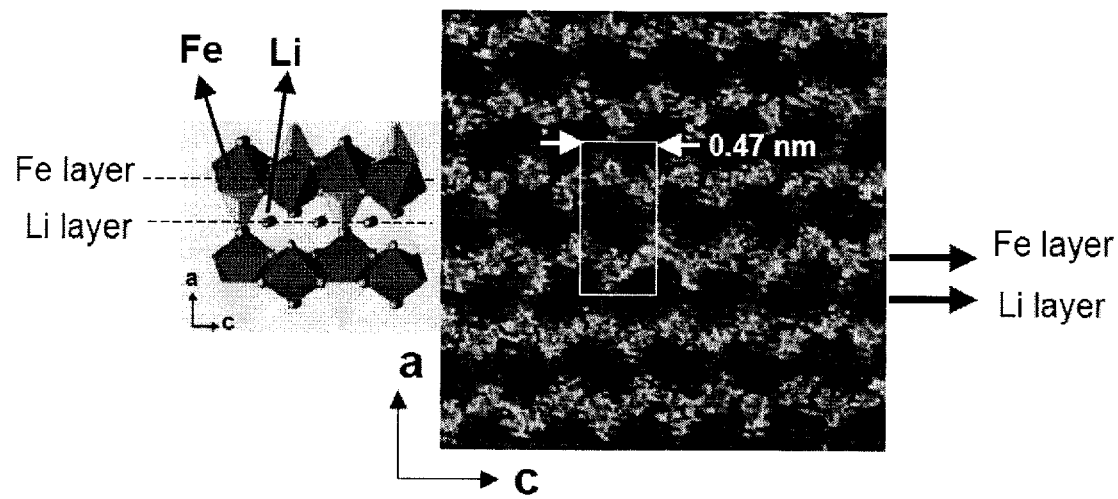
FIG. 15 is a crystal lattice image of $LiFePO_4$ taken using a High-Angle Annular Dark Field (HAADF) scanning TEM in Analysis Example 2 of the present invention.

FIG. 15 shows a crystal lattice image of LiFePO$_4$ taken using a HAADF STEM imaging in Analysis Example 2 in accordance with the present invention. The left image in FIG. 15 schematically shows crystal lattice of the LiFePO$_4$. As shown in FIG. 15, the LiFePO$_4$ should have a crystal structure wherein lithium and iron ions are regularly arranged on M' and M" sites, respectively. Further, the right image of FIG. 15 shows a Z-contrast STEM image of the crystal lattice obtained using a HAADF mode in the present Analysis Example 2. An open rectangle indicated in the image represents a unit cell for the [010] projection. For better examination of an ordered arrangement of lithium and iron ions, the particle orientation was adjusted such that the direction, i.e. b-axis, is projected. Lithium has an atomic number of three, which is lower than that of oxygen, and therefore can have no contrast on the image, thus appearing as a black color. On the other hand, iron has a very high atomic number of 26 and shows a bright contrast to thereby form an ordered array in the image. From the fact that the lithium sites exhibit no bright contrast, as observed in the image of FIG. 15, it can be directly confirmed that the LiFePO$_4$ has, as shown in the left schematic view, the well-ordered olivine structure without random intermixing of iron ions in the lithium sites. Therefore, it can be seen that it is possible to prepare crystalline particles of LiMPO$_4$ having excellent cation ordering via the present invention.

Test Example 1

Using $(Li_{1-x}A_x)(M_{1-y}B_y)PO_4$ and $(LiA_x)(MB_y)PO_4$ (A or B=Na, K, La, Ce, Pr, Nd, Sm, Gd, or Er, $0<x\leq0.1$, $0<x\leq0.1$, and $0<y\leq0.1$) powders having various compositions prepared in previous Examples, electrical resistance was measured for sintered samples of the powders. The present Test Example 1 demonstrates that the lithium transition metal phosphates prepared according to the present invention exhibit a high electrical conductivity, as compared to those prepared by a conventional method.

Samples for measurement of the electrical conductivity were prepared in the same manner as described before, such that they have a microstructure as shown in FIGS. 7 and 13. That is, powders subjected to first calcination at 350° C. for 2 to 5 hours were put into a metal mold, and compacted into a disk having a diameter of 9 mm and a thickness of 1 mm by application of 6 MPa pressure. For the second heat treatment, the thus-prepared molded materials were heat-treated at a temperature of 700 to 850° C. under the same argon atmosphere for 5 to 10 hours to thereby prepare polycrystals having a homogeneous structure.

Surfaces of the thus-prepared polycrystalline sintered materials were ground with SiC sand paper (#1200). Using a multimeter, the electrical resistance for the surface of sintered materials was measured at room temperature by positioning electrodes at a distance of 1 cm apart on the surface. The electrical resistance was non-measurable (out of scale) in pure LiFePO$_4$, LiCoPO$_4$ and LiMnPO$_4$ to which no additives were added, due to intrinsically high electrical resistivity as mentioned hereinbefore. On the other hand, other lithium transition metal phosphates prepared by the present invention were found to have a low resistance value of several tens of kΩ to several hundreds of kΩ preferably 20 kΩ to 800 kΩ. As used herein, the term "non-measurable" means that the electrical resistance is at least 100 MΩ. Compositions, sintering conditions of second heat treatment and surface electrical resistance values for the samples measured in the present Test Example 1 are summarized in Table 5 below.

TABLE 5

| Composition | First calcination | Second sintering | Electrical resistance (KΩ) |
|---|---|---|---|
| LiFePO$_4$ (undoped) | 350° C. 8 h, Ar | 700° C. 20 h, Ar | Out of scale(at least 100 MΩ) |
| LiFe$_{0.98}$Na$_{0.04}$PO$_4$ | 350° C. 8 h, Ar | 700° C. 20 h, Ar | 600-800 |
| LiCo$_{0.98}$Na$_{0.04}$PO$_4$ | 350° C. 8 h, Ar | 700° C. 18 h, Ar | 20-90 |
| LiFe$_{0.98}$K$_{0.04}$PO$_4$ | 350° C. 8 h, Ar | 700° C. 12 h, Ar | 200-500 |
| LiK$_{0.04}$FePO$_4$ | 350° C. 5 h, Ar | 800° C. 8 h, Ar | 20-50 |
| Li$_{0.85}$K$_{0.04}$FePO$_4$ | 350° C. 5 h, Ar | 800° C. 8 h, Ar | 20-30 |
| Li$_{0.70}$K$_{0.04}$FePO$_4$ | 350° C. 5 h, Ar | 800° C. 8 h, Ar | 40-50 |
| Li$_{0.50}$K$_{0.04}$FePO$_4$ | 350° C. 5 h, Ar | 800° C. 8 h, Ar | 20-40 |
| LiFe$_{0.98}$Na$_{0.04}$PO$_4$ | 350° C. 8 h, Ar | 800° C. 5 h, Ar | 50-200 |
| Li$_{0.95}$Na$_{0.05}$FePO$_4$ | 350° C. 8 h, Ar | 850° C. 5 h, Ar | 30-100 |
| Li$_{0.95}$Na$_{0.05}$FePO$_4$ | 350° C. 5 h, Ar | 800° C. 5 h, Ar | 50-300 |

Test Example 2

This example is intended to demonstrate that a low electrical resistance value of the samples measured in Test Example 1 arises from a decreased electrical resistance of crystal lattices per se, not as a result dependent upon the presence of other secondary phases in the grain boundaries. For this purpose, the sintered polycrystalline pellets were finely polished, and Pt microelectrodes were deposited on the surface, followed by measurement of current-voltage characteristics.

The dense polycrystalline sample used in the present Test Example 2 was LiFePO$_4$ with addition of 4-mol % K, which was prepared in Test Example 1 and then sintered at 850° C. for 10 hours. First, in order to examine a microstructure of the lithium iron phosphate, the sintered samples were mounted by using polyester resin. This was followed by fine polishing of the samples, using a micron-graded diamond abrasive in order of 6 μm, 3 μm and 1 μm. The thus-prepared samples were subjected to chemical etching for 5 sec in distilled water containing 3 vol % of HCl dissolved therein.

Figure 16:
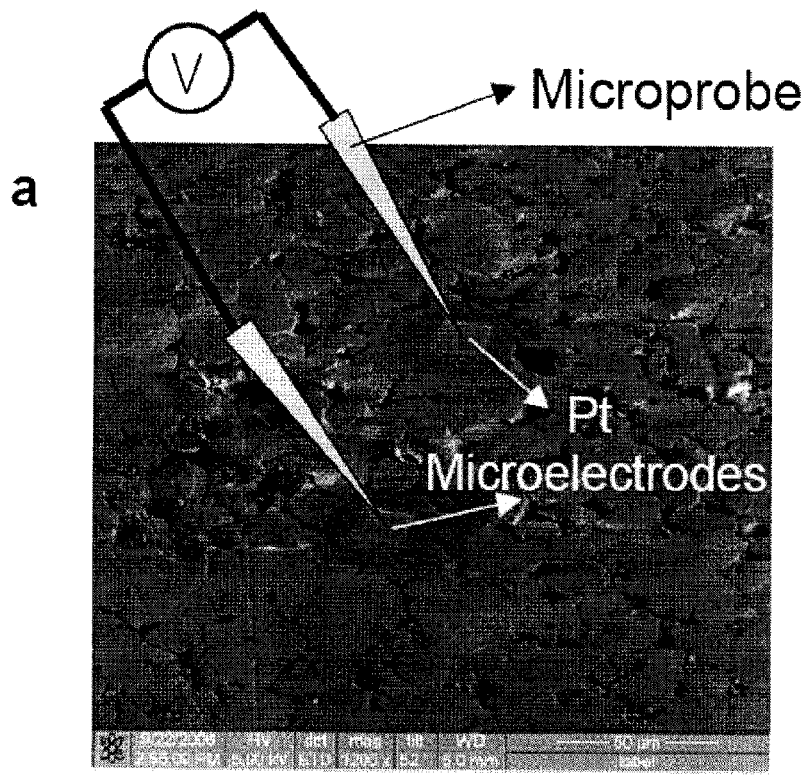
FIG. 16 is a scanning electron micrograph showing a typical microstructure of a polycrystalline $LiFePO_4$ sample used in Test Example 2 of the present invention.

FIG. 16 is a scanning electron micrograph showing a typical microstructure of the polycrystalline $LiFePO_4$ sample used in the present Test Example 2. As shown in FIG. 16, square-shaped Pt microelectrodes having each side length of 20 μm were deposited on the single grains having a size of 40 to 50 μm. It can be seen that such Pt-microelectrodes have a smaller size than the individual single grains of lithium iron phosphate and therefore have a structure which is very useful to investigate current-voltage characteristics for the inside of particles, irrespective of the grain boundaries. Further, as shown in FIG. 16, microprobes having a diameter of 1 μm were positioned on the microelectrodes, and current changes were measured with application of a gradually increasing voltage of up to 6V.

Figure 17:
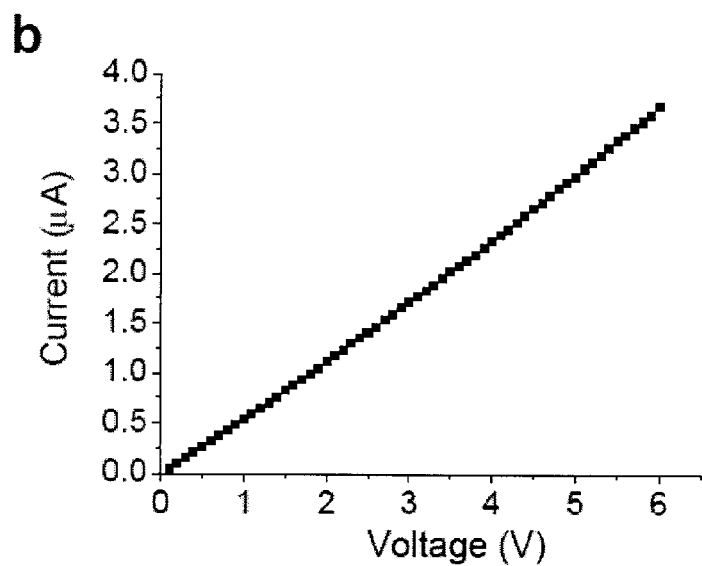
FIG. 17 is a graph showing a current-voltage relationship between particles, measured using a microprobe and platinum (Pt) microelectrodes in Test Example 2 of the present invention.

FIG. 17 is a graph showing a current-voltage relationship between grains, measured using a microprobe and Pt microelectrodes in Test Example 2 of the present invention. Therefore, it can be seen that the sample of $LiFePO_4$ with addition of 4-mol % K prepared by the present invention exhibits a flow of a high current of several μA ($10^{-6}$ A), as shown in FIG. 17, while a conventional $LiFePO_4$ exhibits a current of only several tens of pA ($10^{-14}$ A) in current-voltage characteristics (S.-Y. Chung and Y.-M. Chiang, *Electrochem. Solid-State Lett.*, Vol. 6, p. A278 (2003)).

In conclusion, it can be seen that it is possible to easily prepare the lithium transition metal phosphate having low electrical resistance and excellent electrical conductivity, through the results of Test Examples 1 and 2.

Test Example 3

Electrochemical performance was measured for nanocrystalline particles of lithium transition metal phosphates prepared according to the present invention. More specifically, charge/discharge characteristics were tested for applicability of the lithium transition metal phosphate as a cathode material for a lithium ion secondary battery. The results show through Test Example 3 that nanoparticles of lithium transition metal phosphate prepared in the present invention have a high energy density as well as an excellent power density.

In order to measure electrochemical charge/discharge characteristics in the present Test Example 3, $LiFePO_4$ nanopowder with addition of 4-mol % Na and $LiFePO_4$ nanopowder with addition of 4-mol % K were selected from powder samples prepared in previous Examples.

First, in order to fabricate an electrode, the $LiFePO_4$ nanopowder with addition of 4-mol % Na, Ketjen black carbon, and polyvinylidene difluoride (PVDF, KynarFlex 2801, Elf Atochem) were mixed in a weight ratio of 80:10:10. N-methyl-2-pyrrolidone (NMP) was used as a solvent. In order to ensure homogeneous mixing, the materials were mixed using a mixer equipped with a homogenizer rotating at 3000 rpm. The resulting slurry was applied to aluminum foil, and dried in a vacuum oven to thereby prepare a cathode coating.

Fabrication of a cell for a battery test was carried out by a conventional method known in the art. A lithium metal foil was used as an anode and Celgard 2400 (Hoechst Celanese Corp.) as a separator was disposed between the cathode and the anode. As an electrolyte, a mixed solution of ethylene carbonate (EC) and diethyl carbonate (DEC) or dimethyl carbonate (DMC) containing 1 M $LiPF_6$ was used.

Figure 18:
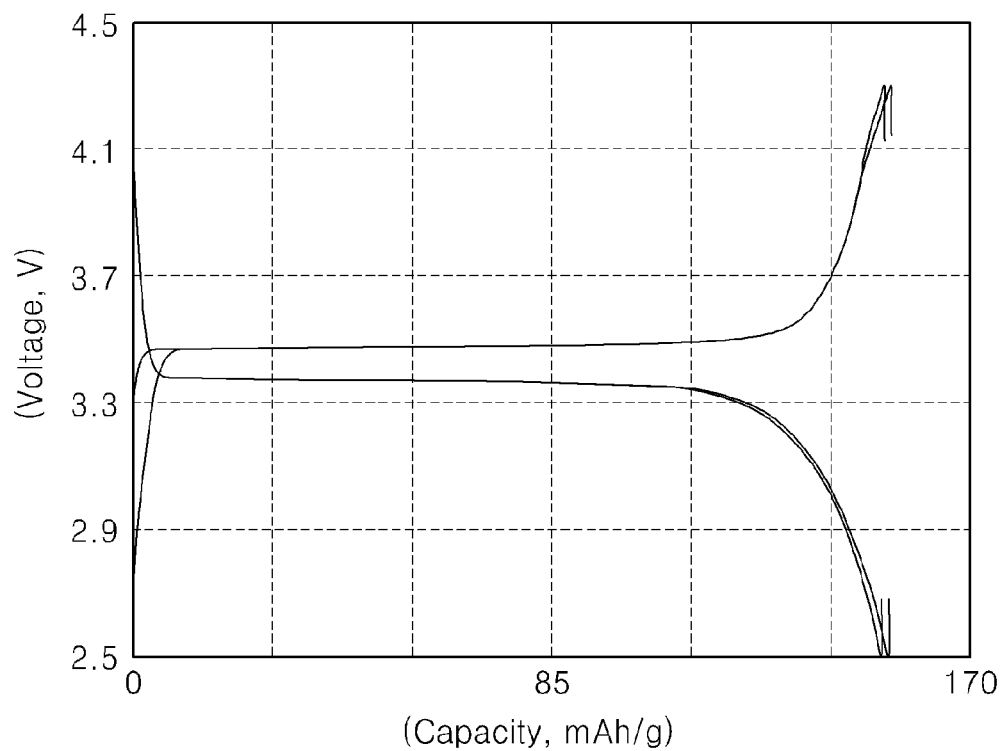
FIG. 18 is a graph showing cell test results for charge/discharge characteristics in Test Example 3, performed using nanoparticles of $LiFePO_4$ with addition of 4-mol % Na prepared in Example 1 of the present invention.

Test results for the thus fabricated electrode assembly are shown in FIG. 18. That is, FIG. 18 shows charge/discharge curves calculated when galvanostatic measurement was carried out at a current of 32 mA/g, i.e. a current rate of 0.2 C, on the assumption that a theoretical capacity is 160 mAh/g. Upon measurement at a voltage of 2.5 to 4.3 V, the capacity was about 150 mAh/g. Therefore, it can be seen that the $LiFePO_4$ nanopowder prepared in the present invention exhibits an excellent capacity approximate to the theoretical capacity.

Further, the $LiFePO_4$ nanopowder with addition of 4-mol % K, Ketjen black carbon, and polyvinylidene difluoride (PVDF) (KynarFlex 2801) were mixed in a weight ratio of 80:10:10. According to the same procedure, an electrode coating was prepared and then a test cell was assembled. Charge of the cell in this test was carried out by a constant current/constant voltage (CC/CV) charge method, at a charge current of 0.5 C, e.g. 80 mA/g and a voltage of 4.3 V. For a discharge test, output power characteristics obtainable upon rapid discharge were examined by application of various discharge currents to the test cell, using a conventional galvanostatic constant current (CC) method.

Figure 19:
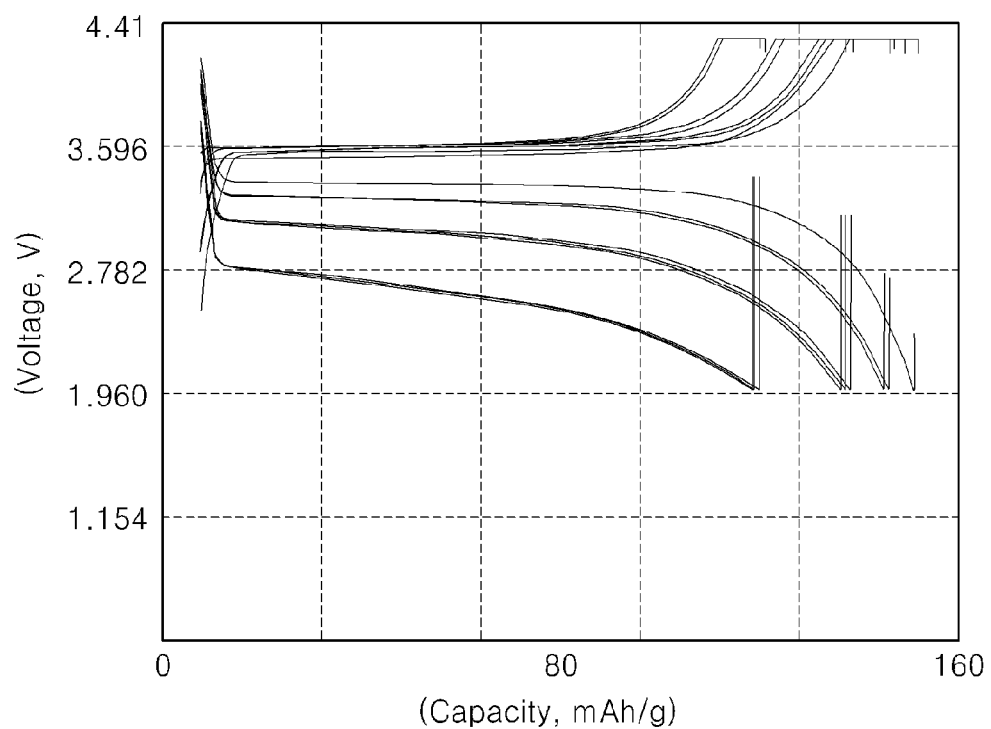
FIG. 19 is a graph showing cell test results for charge/discharge characteristics in Test Example 3, performed using nanoparticles of $LiFePO_4$ with addition of 4-mol % K prepared in Examples 1 and 3 of the present invention.

FIG. 19 shows the test results for charge/discharge characteristics of the battery cell, performed under various conditions, using the $LiFePO_4$ nanopowder with addition of 4-mol % K. As shown in FIG. 19, it can be seen that the cell exhibits about 150 mAh/g, similar to that shown by the previous test, under a sufficiently slow current discharge condition of 0.2 C, thus providing an excellent energy density. More importantly, it can be confirmed that the cell is capable of retaining a very high capacity of more than about 110 mAh/g even upon rapid discharge at a high current rate of more than 10 C. Therefore, these results directly indicate that the nanopowder of the present invention can be applied as a cathode material for a high-power lithium battery, due to the capability to discharge large amounts of current within a short period of time.

Figure 20:
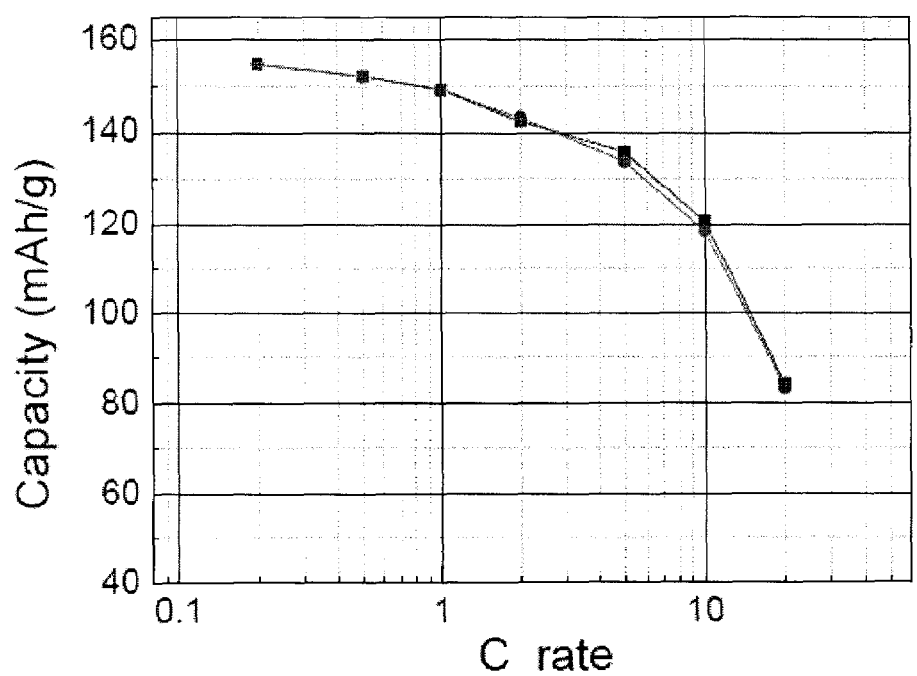
FIG. 20 is a graph showing changes in discharge capacity with various discharge rates, for results of a cell test performed using nanoparticles of LiFePO$_4$ with addition of 4-mol % Na prepared in Example 1 of the present invention.

FIG. 20 is a graph showing a discharge capacity of the battery with a varying discharge rate, obtained when a battery test was carried out in the same manner as above, using the 4-mol % Na-added $LiFe_{0.98}PO_4$ nanopowder. As shown in FIG. 20, the battery cell exhibited a high capacity of about 155 mAh/g corresponding to substantially the theoretical capacity, at a low discharge rate of 0.2 C and maintained an excellent discharge capacity of more than 80 mAh/g particularly even at a rapid discharge rate of 20 C. Upon calculation of a power density from the results at a discharge rate of 20 C on the basis of a lithium metal anode, it was confirmed that the battery cell exhibits a very high output power of more than 9,900 W/kg.

Accordingly, the present Test Example 3 demonstrates that the nanoparticles of lithium transition metal phosphate prepared in the present invention can be employed as a lithium battery cathode material capable of realizing excellent energy density and power density.

As illustrated above, it can be seen that the present invention enables easy and convenient production of nanoparticles of lithium transition metal phosphate having a uniform particle size of less than 100 nm at a low temperature of less than 500° C. within a short period of time of less than 5 hours, via a simple solid-state synthesis. In particular, the method of the present invention is a synthesis method which does not involve liquid-state raw materials or complicated and difficult coating processes and employs inexpensive solid salts, so it is advantageously possible to achieve industrial-scale production of a desired product. In addition, the nanoparticles of lithium transition metal phosphate thus synthesized have an excellent electrical conductivity and no anti-site intermixing defects between lithium ions and transition metal ions within crystal lattices, and therefore can advantageously exhibit excellent electrochemical performance. Therefore, upon practical application of the nanoparticles of the present invention as a cathode active material for a lithium ion secondary battery, it is possible to exert a high energy density due to an excellent discharge capacity. More importantly, it can be seen that it is possible to fabricate a battery having a very high power density, based on charge/discharge performance during a short period of time.

The invention claimed is:

1. A process for preparing a nanoparticle powder of a lithium transition metal phosphate, comprising:
    mixing lithium, a transition metal and a phosphorus-containing salt as starting materials,
    adding an additive to the starting materials in an amount of greater than 0 at % and less than 10 at % to obtain a mixed raw material powder, wherein the additive comprising any one element selected from the group consisting of sodium (Na), potassium (K), lanthanum (La), cerium (Ce), praseodymium (Pr), neodymium (Nd), samarium (Sm), gadolinium (Gd) and erbium (Er);
    subjecting the mixed powder to a first heat treatment at a temperature of 250 C to 400 C under a gas atmosphere for 2 to 10 hours; and
    subjecting the first heat-treated product to a second heat treatment at a temperature of 400 C to 700 C for 2 to 24 hours to uniformly form crystalline nuclei so as to induce growth of nanocrystalline particles.

2. The process according to claim 1, wherein the starting material is selected from the group consisting of carbonates, oxalates, acetates, ammonium phosphates and any combination thereof.

3. The process according to claim 2, wherein the carbonate includes lithium carbonate ($Li_2CO_3$).

4. The process according to claim 2, wherein the oxalate includes $MC_2O_4(2H_2O)$ (M=Fe, Mn, Co, Ni, Ti, Cu or any combination thereof).

5. The process according to claim 2, wherein the ammonium phosphate includes ammonium dihydrogen phosphate ($NH_4H_2PO_4$).

6. The process according to claim 1, wherein the additive includes sodium carbonate ($Na_2CO_3$).

7. The process according to claim 1, wherein the additive includes potassium carbonate ($K_2CO_3$).

8. The process according to claim 1, wherein an additive for the lanthanide element includes $A_2(C_2O_4)_3(nH_2O)$ (A=La, Ce, Pr, Nd, Sm, Gd, or Er, and $1 \leq n \leq 9$) as a carbon-containing salt material.

9. The process according to claim 8, wherein the additive for the lanthanide element is at least one selected from the group consisting of $Ce_2(C_2O_4)_3(9H_2O)$, $Nd_2(C_2O_4)_3(5H_2O)$, $Gd_2(C_2O_4)_3(5H_2O)$, $Er_2(C_2O_4)_3(5H_2O)$ and any combination thereof.

10. The process according to claim 1, wherein the additive element is added to make an initial stoichiometric composition of $(Li_{1-x}A_x)(M_{1-y}B_y)PO_4$ (A or B=Na, K, La, Ce, Pr, Nd, Sm, Gd, or Er, $0<x\leq 0.1$, $0<y\leq 0.1$, and M=Fe, Mn, Co, Ni, Ti, Cu or any combination thereof).

11. The process according to claim 1, wherein the additive element is added to make an initial stoichiometric composition of $(LiA_x)(MB_y)PO_4$ (A or B=Na, K, La, Ce, Pr, Nd, Sm, Gd, or Er, $0<x\leq 0.1$, $0<y\leq 0.1$, and M=Fe, Mn, Co, Ni, Ti, Cu or any combination thereof).

12. The process according to claim 1, wherein the mixed powder is obtained by wet-mixing the starting materials and additives in acetone as a solvent and drying the mixture.

13. The process according to claim 1, wherein the first heat treatment is carried out under the gas atmosphere of any one selected from the group consisting of argon (Ar) and nitrogen ($N_2$), at a flow rate of 100 to 500 cc/min.

14. The process according to claim 1, wherein the first heat treatment is carried out at 350 C for 5 hours or less.

15. The process according to claim 1, wherein the second heat treatment is carried out under the gas atmosphere of any one selected from the group consisting of argon (Ar) and nitrogen ($N_2$), at a flow rate of 100 to 500 cc/min.

16. The process according to claim 1, wherein the nanocrystalline particles have a particle size of less than 100 nm.

17. The process according to claim 1, wherein the nanocrystalline particles have a olivine structure.

18. The process according to claim 1, wherein the nanocrystalline particles have a resistance value of 20 k$\Omega$ to 800 k$\Omega$.

19. The process according to claim 1, wherein the gas atmosphere is an inert gas atmosphere.

\* \* \* \* \*